(12) United States Patent
Wong et al.

(10) Patent No.: US 8,155,011 B2
(45) Date of Patent: *Apr. 10, 2012

(54) TECHNIQUES FOR USING DUAL MEMORY STRUCTURES FOR PROCESSING FAILURE DETECTION PROTOCOL PACKETS

(75) Inventors: Yuen Wong, San Jose, CA (US);
Pedman Moobed, San Jose, CA (US)

(73) Assignee: Foundry Networks, LLC, San Jose, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 11/953,751

(22) Filed: Dec. 10, 2007

(65) Prior Publication Data

US 2009/0279542 A1 Nov. 12, 2009

Related U.S. Application Data

(60) Provisional application No. 60/880,074, filed on Jan. 11, 2007.

(51) Int. Cl.
*G01R 31/08* (2006.01)
*H04L 12/28* (2006.01)
*H04L 12/54* (2006.01)
*G06F 17/30* (2006.01)
*G06F 12/02* (2006.01)

(52) U.S. Cl. .............. 370/241; 370/241.1; 370/242; 370/382; 370/392; 370/395.71; 370/429; 711/1; 711/100; 711/101; 707/791; 707/800; 707/802; 707/809

(58) Field of Classification Search .............. None
See application file for complete search history.

(56) References Cited

U.S. PATENT DOCUMENTS

| 3,866,175 | A | 2/1975 | Seifert, Jr. et al. |
| 4,325,119 | A | 4/1982 | Grandmaison et al. |
| 4,348,725 | A | 9/1982 | Farrell et al. |
| 4,628,480 | A | 12/1986 | Floyd |
| 4,667,323 | A | 5/1987 | Engdahl et al. |
| 4,683,564 | A | 7/1987 | Young et al. |
| 4,698,748 | A | 10/1987 | Juzswik et al. |
| 4,723,243 | A | 2/1988 | Joshi et al. |

(Continued)

FOREIGN PATENT DOCUMENTS

EP 1380127 A2 1/2004

(Continued)

OTHER PUBLICATIONS

U.S. Appl. No. 12/198,697, filed Aug. 26, 2008, Hsu et al.

(Continued)

*Primary Examiner* — Kevin C Harper
*Assistant Examiner* — Christine Duong
(74) *Attorney, Agent, or Firm* — Kilpatrick Townsend & Stockton LLP

(57) ABSTRACT

Techniques are provided for assisting in the processing of failure detection protocol (FDP) packets. Techniques are provided that assist a CPU of a network device in processing incoming FDP packets. In one embodiment, only a subset of FDP packets received by the network device is forwarded to the CPU for processing, the other FDP packets are dropped and not forwarded to the CPU. The processing is performed using dual memory structures that enable receipt of FDP packets by the network device to be decoupled from the processing of FDP packets by the CPU of the network device.

17 Claims, 16 Drawing Sheets

U.S. PATENT DOCUMENTS

| | | | |
|---|---|---|---|
| 4,754,482 A | 6/1988 | Weiss |
| 4,791,629 A | 12/1988 | Burns et al. |
| 4,794,629 A | 12/1988 | Pastyr et al. |
| 4,807,280 A | 2/1989 | Posner et al. |
| 4,876,681 A | 10/1989 | Hagiwara et al. |
| 4,896,277 A | 1/1990 | Vercellotti et al. |
| 4,985,889 A | 1/1991 | Frankish et al. |
| 5,101,404 A | 3/1992 | Kunimoto et al. |
| 5,136,584 A | 8/1992 | Hedlund |
| 5,195,181 A | 3/1993 | Bryant et al. |
| 5,208,856 A | 5/1993 | Leduc et al. |
| 5,224,108 A | 6/1993 | McDysan et al. |
| 5,231,633 A | 7/1993 | Hluchyj et al. |
| 5,280,582 A | 1/1994 | Yang et al. |
| 5,282,196 A | 1/1994 | Clebowicz |
| 5,287,477 A | 2/1994 | Johnson et al. |
| 5,299,190 A | 3/1994 | LaMaire et al. |
| 5,299,195 A | 3/1994 | Shah |
| 5,301,192 A | 4/1994 | Henrion |
| 5,307,345 A | 4/1994 | Lozowick et al. |
| 5,323,386 A | 6/1994 | Wiher et al. |
| 5,365,512 A | 11/1994 | Combs et al. |
| 5,377,189 A | 12/1994 | Clark |
| 5,390,173 A | 2/1995 | Spinney et al. |
| 5,392,279 A | 2/1995 | Taniguchi |
| 5,406,643 A | 4/1995 | Burke et al. |
| 5,408,469 A | 4/1995 | Opher et al. |
| 5,430,442 A | 7/1995 | Kaiser et al. |
| 5,436,893 A | 7/1995 | Barnett |
| 5,461,615 A | 10/1995 | Henrion |
| 5,490,258 A | 2/1996 | Fenner |
| 5,506,840 A | 4/1996 | Pauwels et al. |
| 5,506,841 A | 4/1996 | Sandquist |
| 5,521,923 A | 5/1996 | Willmann et al. |
| 5,546,385 A | 8/1996 | Caspi et al. |
| 5,550,816 A | 8/1996 | Hardwick et al. |
| 5,563,948 A | 10/1996 | Diehl et al. |
| 5,566,170 A | 10/1996 | Bakke et al. |
| 5,598,410 A | 1/1997 | Stone |
| 5,600,795 A | 2/1997 | Du |
| 5,619,497 A | 4/1997 | Gallagher et al. |
| 5,640,504 A | 6/1997 | Johnson et al. |
| 5,646,878 A | 7/1997 | Samra |
| 5,663,952 A | 9/1997 | Gentry, Jr. |
| 5,663,959 A | 9/1997 | Nakagawa |
| 5,666,353 A | 9/1997 | Klausmeier et al. |
| 5,721,819 A | 2/1998 | Galles et al. |
| 5,732,080 A | 3/1998 | Ferguson et al. |
| 5,734,826 A | 3/1998 | Olnowich et al. |
| 5,740,176 A | 4/1998 | Gupta et al. |
| 5,745,708 A | 4/1998 | Weppler et al. |
| 5,751,710 A | 5/1998 | Crowther et al. |
| 5,802,287 A | 9/1998 | Rostoker et al. |
| 5,815,146 A | 9/1998 | Youden et al. |
| 5,818,816 A | 10/1998 | Chikazawa et al. |
| 5,835,496 A | 11/1998 | Yeung et al. |
| 5,838,684 A | 11/1998 | Wicki et al. |
| 5,862,350 A | 1/1999 | Coulson |
| 5,864,555 A | 1/1999 | Mathur et al. |
| 5,867,675 A | 2/1999 | Lomelino et al. |
| 5,870,538 A | 2/1999 | Manning et al. |
| 5,872,769 A | 2/1999 | Caldara et al. |
| 5,872,783 A | 2/1999 | Chin |
| 5,875,200 A | 2/1999 | Glover et al. |
| 5,896,380 A | 4/1999 | Brown et al. |
| 5,907,566 A | 5/1999 | Benson et al. |
| 5,907,660 A | 5/1999 | Inoue et al. |
| 5,909,686 A | 6/1999 | Muller et al. |
| 5,915,094 A | 6/1999 | Kouloheris et al. |
| 5,920,566 A | 7/1999 | Hendel et al. |
| 5,920,886 A | 7/1999 | Feldmeier |
| 5,936,939 A | 8/1999 | Des Jardins et al. |
| 5,936,966 A | 8/1999 | Ogawa et al. |
| 5,956,347 A | 9/1999 | Slater |
| 5,999,528 A | 12/1999 | Chow et al. |
| 6,000,016 A | 12/1999 | Curtis et al. |
| 6,011,910 A | 1/2000 | Chau et al. |
| 6,016,310 A | 1/2000 | Muller et al. |
| 6,023,471 A | 2/2000 | Haddock et al. |
| 6,031,843 A | 2/2000 | Swanbery et al. |
| 6,035,414 A | 3/2000 | Okazawa et al. |
| 6,038,288 A | 3/2000 | Thomas et al. |
| 6,067,298 A | 5/2000 | Shinohara |
| 6,067,606 A | 5/2000 | Holscher et al. |
| 6,076,115 A | 6/2000 | Sambamurthy et al. |
| 6,081,522 A | 6/2000 | Hendel et al. |
| 6,088,356 A | 7/2000 | Hendel et al. |
| 6,094,434 A | 7/2000 | Kotzur et al. |
| 6,104,696 A | 8/2000 | Kadambi et al. |
| 6,104,700 A | 8/2000 | Haddock et al. |
| 6,108,306 A | 8/2000 | Kalkunte et al. |
| 6,118,787 A | 9/2000 | Kalkunte et al. |
| 6,125,417 A | 9/2000 | Bailis et al. |
| 6,128,666 A | 10/2000 | Muller et al. |
| 6,144,668 A | 11/2000 | Bass et al. |
| 6,147,996 A | 11/2000 | Laor et al. |
| 6,151,301 A | 11/2000 | Holden |
| 6,151,497 A | 11/2000 | Yee et al. |
| 6,154,446 A | 11/2000 | Kadambi et al. |
| 6,157,643 A | 12/2000 | Ma |
| 6,160,809 A | 12/2000 | Adiletta et al. |
| 6,160,812 A | 12/2000 | Bauman et al. |
| 6,172,990 B1 | 1/2001 | Deb et al. |
| 6,178,520 B1 | 1/2001 | DeKoning et al. |
| 6,181,699 B1 | 1/2001 | Crinion et al. |
| 6,185,222 B1 | 2/2001 | Hughes |
| 6,195,335 B1 | 2/2001 | Calvignac et al. |
| 6,201,492 B1 | 3/2001 | Amar et al. |
| 6,222,845 B1 | 4/2001 | Shue et al. |
| 6,243,667 B1 | 6/2001 | Kerr et al. |
| 6,249,528 B1 | 6/2001 | Kothary |
| 6,263,374 B1 | 7/2001 | Olnowich et al. |
| 6,272,144 B1 | 8/2001 | Berenbaum et al. |
| 6,304,903 B1 | 10/2001 | Ward |
| 6,320,859 B1 | 11/2001 | Momirov |
| 6,333,929 B1 | 12/2001 | Drottar et al. |
| 6,335,932 B2 | 1/2002 | Kadambi et al. |
| 6,335,935 B2 | 1/2002 | Kadambi et al. |
| 6,343,072 B1 | 1/2002 | Bechtolsheim et al. |
| 6,351,143 B1 | 2/2002 | Guccione et al. |
| 6,356,550 B1 | 3/2002 | Williams |
| 6,356,942 B1 | 3/2002 | Bengtsson et al. |
| 6,359,879 B1 | 3/2002 | Carvey et al. |
| 6,363,077 B1 | 3/2002 | Wong et al. |
| 6,366,557 B1 | 4/2002 | Hunter |
| 6,369,855 B1 | 4/2002 | Chauvel et al. |
| 6,421,352 B1 | 7/2002 | Manaka et al. |
| 6,424,658 B1 | 7/2002 | Mather |
| 6,424,659 B2 | 7/2002 | Viswanadham et al. |
| 6,427,185 B1 | 7/2002 | Ryals et al. |
| 6,430,190 B1 | 8/2002 | Essbaum et al. |
| 6,457,175 B1 | 9/2002 | Lerche |
| 6,459,705 B1 | 10/2002 | Cheng |
| 6,460,088 B1 | 10/2002 | Merchant |
| 6,463,063 B1 | 10/2002 | Bianchini, Jr. et al. |
| 6,466,608 B1 | 10/2002 | Hong et al. |
| 6,470,436 B1 | 10/2002 | Croft et al. |
| 6,473,428 B1 | 10/2002 | Nichols et al. |
| 6,473,433 B1 | 10/2002 | Bianchini, Jr. et al. |
| 6,477,174 B1 | 11/2002 | Dooley et al. |
| 6,480,477 B1 | 11/2002 | Treadway et al. |
| 6,490,280 B1 | 12/2002 | Leung |
| 6,493,347 B2 | 12/2002 | Sindhu et al. |
| 6,496,502 B1 | 12/2002 | Fite et al. |
| 6,505,281 B1 | 1/2003 | Sherry |
| 6,510,138 B1 | 1/2003 | Pannell |
| 6,522,656 B1 | 2/2003 | Gridley |
| 6,532,229 B1 | 3/2003 | Johnson et al. |
| 6,532,234 B1 | 3/2003 | Yoshikawa |
| 6,535,504 B1 | 3/2003 | Johnson et al. |
| 6,549,519 B1 | 4/2003 | Michels et al. |
| 6,553,370 B1 | 4/2003 | Andreev et al. |
| 6,556,208 B1 | 4/2003 | Congdon et al. |
| 6,567,404 B1 | 5/2003 | Wilford |
| 6,577,631 B1 | 6/2003 | Keenan et al. |
| 6,587,432 B1 | 7/2003 | Putzolu et al. |
| 6,591,302 B2 | 7/2003 | Boucher et al. |

| | | |
|---|---|---|
| 6,601,186 B1 | 7/2003 | Fox et al. |
| 6,606,300 B1 | 8/2003 | Blanc et al. |
| 6,628,650 B1 | 9/2003 | Saite et al. |
| 6,633,580 B1 | 10/2003 | Torudbakken et al. |
| 6,636,483 B1 | 10/2003 | Pannell |
| 6,643,269 B1 | 11/2003 | Fan et al. |
| 6,654,342 B1 | 11/2003 | Dittia et al. |
| 6,654,346 B1 | 11/2003 | Mahalingaiah et al. |
| 6,654,370 B1 | 11/2003 | Quirke et al. |
| 6,654,373 B1 | 11/2003 | Maher, III et al. |
| 6,658,002 B1 | 12/2003 | Ross et al. |
| 6,661,791 B1 | 12/2003 | Brown |
| 6,671,275 B1 | 12/2003 | Wong et al. |
| 6,678,248 B1 | 1/2004 | Haddock et al. |
| 6,681,332 B1 | 1/2004 | Byrne et al. |
| 6,683,872 B1 | 1/2004 | Saito |
| 6,687,217 B1 | 2/2004 | Chow et al. |
| 6,687,247 B1 | 2/2004 | Wilford et al. |
| 6,691,202 B2 | 2/2004 | Vasquez et al. |
| 6,696,917 B1 | 2/2004 | Heitner et al. |
| 6,697,359 B1 | 2/2004 | George |
| 6,697,368 B2 | 2/2004 | Chang et al. |
| 6,700,894 B1 | 3/2004 | Shung |
| 6,708,000 B1 | 3/2004 | Nishi et al. |
| 6,721,229 B1 | 4/2004 | Cole |
| 6,721,268 B1 | 4/2004 | Ohira et al. |
| 6,721,313 B1 | 4/2004 | Van Duyne |
| 6,721,338 B1 | 4/2004 | Sato |
| 6,731,875 B1 | 5/2004 | Kartalopoulos |
| 6,735,218 B2 | 5/2004 | Chang et al. |
| 6,745,277 B1 | 6/2004 | Lee et al. |
| 6,747,971 B1 | 6/2004 | Hughes et al. |
| 6,751,224 B1 | 6/2004 | Parruck et al. |
| 6,754,881 B2 | 6/2004 | Kuhlmann et al. |
| 6,765,866 B1 | 7/2004 | Wyatt |
| 6,775,706 B1 | 8/2004 | Fukumoto et al. |
| 6,778,546 B1 | 8/2004 | Epps et al. |
| 6,781,990 B1 | 8/2004 | Puri et al. |
| 6,785,290 B1 | 8/2004 | Fujisawa et al. |
| 6,788,697 B1 | 9/2004 | Aweya et al. |
| 6,792,484 B1 | 9/2004 | Hook |
| 6,792,502 B1 | 9/2004 | Pandya et al. |
| 6,798,740 B1 | 9/2004 | Senevirathne et al. |
| 6,804,220 B2 | 10/2004 | Odenwalder et al. |
| 6,804,731 B1 | 10/2004 | Chang et al. |
| 6,807,179 B1 | 10/2004 | Kanuri et al. |
| 6,807,363 B1 | 10/2004 | Abiko et al. |
| 6,810,038 B1 | 10/2004 | Isoyama et al. |
| 6,810,046 B2 | 10/2004 | Abbas et al. |
| 6,813,243 B1 | 11/2004 | Epps et al. |
| 6,813,266 B1 | 11/2004 | Chiang et al. |
| 6,816,467 B1 | 11/2004 | Muller et al. |
| 6,831,923 B1 | 12/2004 | Laor et al. |
| 6,831,932 B1 | 12/2004 | Boyle et al. |
| 6,836,808 B2 | 12/2004 | Bunce et al. |
| 6,839,346 B1 | 1/2005 | Kametani |
| 6,842,422 B1 | 1/2005 | Bainchini, Jr. |
| 6,854,117 B1 | 2/2005 | Roberts |
| 6,856,600 B1 | 2/2005 | Russell et al. |
| 6,859,438 B2 | 2/2005 | Haddock et al. |
| 6,865,153 B1 | 3/2005 | Hill et al. |
| 6,901,072 B1 | 5/2005 | Wong |
| 6,906,936 B1 | 6/2005 | James et al. |
| 6,912,637 B1 | 6/2005 | Herbst |
| 6,920,154 B1 | 7/2005 | Aschler |
| 6,925,516 B2 | 8/2005 | Struhsaker et al. |
| 6,934,305 B1 | 8/2005 | Dushcatko et al. |
| 6,937,606 B2 | 8/2005 | Basso et al. |
| 6,946,948 B2 | 9/2005 | McCormack et al. |
| 6,957,258 B2 | 10/2005 | Maher, III et al. |
| 6,959,007 B1 | 10/2005 | Vogel et al. |
| 6,973,092 B1 | 12/2005 | Zhou et al. |
| 6,975,599 B1 | 12/2005 | Johnson et al. |
| 6,978,309 B1 | 12/2005 | Dorbolo |
| 6,980,552 B1 | 12/2005 | Belz et al. |
| 6,982,974 B1 | 1/2006 | Saleh et al. |
| 6,990,102 B1 | 1/2006 | Kaniz et al. |
| 6,993,032 B1 | 1/2006 | Dammann et al. |
| 6,996,663 B1 | 2/2006 | Marsteiner |
| 7,005,812 B2 | 2/2006 | Mitchell |
| 7,009,968 B2 | 3/2006 | Ambe et al. |
| 7,012,919 B1 | 3/2006 | So et al. |
| 7,050,430 B2 | 5/2006 | Kalkunte et al. |
| 7,080,238 B2 | 7/2006 | Van Hoof et al. |
| 7,082,133 B1 | 7/2006 | Lor et al. |
| 7,103,041 B1 | 9/2006 | Speiser et al. |
| 7,120,744 B2 | 10/2006 | Klein |
| 7,126,948 B2 | 10/2006 | Gooch et al. |
| 7,126,956 B2 | 10/2006 | Scholten |
| 7,151,797 B2 | 12/2006 | Limberg |
| 7,161,948 B2 | 1/2007 | Sampath et al. |
| 7,167,471 B2 | 1/2007 | Calvignac et al. |
| 7,176,911 B1 | 2/2007 | Kidono et al. |
| 7,185,141 B1 | 2/2007 | James et al. |
| 7,185,266 B2 | 2/2007 | Blightman et al. |
| 7,187,687 B1 | 3/2007 | Davis et al. |
| 7,190,696 B1 | 3/2007 | Manur et al. |
| 7,191,277 B2 | 3/2007 | Broyles |
| 7,191,468 B2 | 3/2007 | Hanner |
| 7,203,194 B2 | 4/2007 | Chang et al. |
| 7,206,283 B2 | 4/2007 | Chang et al. |
| 7,212,536 B2 | 5/2007 | MacKiewich et al. |
| 7,218,637 B1 | 5/2007 | Best et al. |
| 7,219,293 B2 | 5/2007 | Tsai et al. |
| 7,228,509 B1 | 6/2007 | Dada et al. |
| 7,236,490 B2 | 6/2007 | Chang et al. |
| 7,237,058 B2 | 6/2007 | Srinivasan |
| 7,249,306 B2 | 7/2007 | Chen |
| 7,266,117 B1 | 9/2007 | Davis |
| 7,272,611 B1 | 9/2007 | Cuppett et al. |
| 7,272,613 B2 | 9/2007 | Sim et al. |
| 7,277,425 B1 | 10/2007 | Sikdar |
| 7,283,547 B1 | 10/2007 | Hook et al. |
| 7,286,534 B2 | 10/2007 | Kloth |
| 7,324,509 B2 | 1/2008 | Ni |
| 7,355,970 B2 | 4/2008 | Lor |
| 7,356,030 B2 | 4/2008 | Chang et al. |
| 7,366,100 B2 | 4/2008 | Anderson et al. |
| 7,391,769 B2 | 6/2008 | Rajkumar et al. |
| 7,428,693 B2 | 9/2008 | Obuchi et al. |
| 7,468,975 B1 | 12/2008 | Davis |
| 7,512,127 B2 | 3/2009 | Chang et al. |
| 7,558,193 B2 | 7/2009 | Bradbury et al. |
| 7,561,590 B1 | 7/2009 | Walsh |
| 7,596,139 B2 | 9/2009 | Patel et al. |
| 7,609,617 B2 | 10/2009 | Appanna et al. |
| 7,613,991 B1 | 11/2009 | Bain |
| 7,636,369 B2 | 12/2009 | Wong |
| 7,649,885 B1 | 1/2010 | Davis et al. |
| 7,657,703 B1 | 2/2010 | Singh |
| 7,813,367 B2 | 10/2010 | Wong |
| 7,817,659 B2 | 10/2010 | Wong et al. |
| 7,830,884 B2 | 11/2010 | Davis |
| 7,903,654 B2 | 3/2011 | Bansal et al. |
| 7,933,947 B2 | 4/2011 | Fleischer et al. |
| 7,948,872 B2 | 5/2011 | Patel et al. |
| 7,953,922 B2 | 5/2011 | Singh |
| 7,953,923 B2 | 5/2011 | Singh |
| 8,014,278 B1 | 9/2011 | Subramanian et al. |
| 2001/0001879 A1 | 5/2001 | Kubik et al. |
| 2001/0007560 A1 | 7/2001 | Masuda et al. |
| 2001/0026551 A1 | 10/2001 | Horlin |
| 2001/0048785 A1 | 12/2001 | Steinberg |
| 2001/0053150 A1 | 12/2001 | Clear et al. |
| 2002/0001307 A1 | 1/2002 | Nguyen et al. |
| 2002/0012585 A1 | 1/2002 | Kalkunte et al. |
| 2002/0040417 A1 | 4/2002 | Winograd et al. |
| 2002/0054594 A1 | 5/2002 | Hoof et al. |
| 2002/0054595 A1 | 5/2002 | Ambe et al. |
| 2002/0069294 A1 | 6/2002 | Herkersdorf et al. |
| 2002/0073073 A1 | 6/2002 | Cheng |
| 2002/0087788 A1 | 7/2002 | Morris |
| 2002/0089937 A1 | 7/2002 | Venkatachary et al. |
| 2002/0089977 A1 | 7/2002 | Chang et al. |
| 2002/0091844 A1 | 7/2002 | Craft et al. |
| 2002/0091884 A1 | 7/2002 | Chang et al. |
| 2002/0097713 A1 | 7/2002 | Chang et al. |
| 2002/0105966 A1 | 8/2002 | Patel et al. |

| | | | |
|---|---|---|---|
| 2002/0126672 A1 | 9/2002 | Chow et al. | |
| 2002/0131437 A1 | 9/2002 | Tagore-Brage | |
| 2002/0141403 A1 | 10/2002 | Akahane et al. | |
| 2002/0146013 A1 | 10/2002 | Karlsson et al. | |
| 2002/0161967 A1 | 10/2002 | Kirihata et al. | |
| 2002/0169786 A1* | 11/2002 | Richek | 707/103 R |
| 2002/0191605 A1 | 12/2002 | Van Lunteren et al. | |
| 2003/0009466 A1 | 1/2003 | Ta et al. | |
| 2003/0012198 A1 | 1/2003 | Kaganoi et al. | |
| 2003/0033435 A1 | 2/2003 | Haner | |
| 2003/0043800 A1 | 3/2003 | Sonksen et al. | |
| 2003/0043848 A1 | 3/2003 | Sonksen | |
| 2003/0048785 A1 | 3/2003 | Calvignac et al. | |
| 2003/0061459 A1 | 3/2003 | Aboulenein et al. | |
| 2003/0074657 A1 | 4/2003 | Bramley, Jr. | |
| 2003/0081608 A1 | 5/2003 | Barri et al. | |
| 2003/0095548 A1 | 5/2003 | Yamano | |
| 2003/0103499 A1 | 6/2003 | Davis et al. | |
| 2003/0103500 A1 | 6/2003 | Menon et al. | |
| 2003/0108052 A1 | 6/2003 | Inoue et al. | |
| 2003/0110180 A1 | 6/2003 | Calvignac et al. | |
| 2003/0115403 A1 | 6/2003 | Bouchard et al. | |
| 2003/0120861 A1 | 6/2003 | Calle et al. | |
| 2003/0128668 A1 | 7/2003 | Yavatkar et al. | |
| 2003/0137978 A1 | 7/2003 | Kanetake | |
| 2003/0152084 A1 | 8/2003 | Lee et al. | |
| 2003/0152096 A1 | 8/2003 | Chapman | |
| 2003/0156586 A1 | 8/2003 | Lee et al. | |
| 2003/0159086 A1 | 8/2003 | Arndt | |
| 2003/0165160 A1 | 9/2003 | Minami et al. | |
| 2003/0169470 A1 | 9/2003 | Alagar et al. | |
| 2003/0174719 A1 | 9/2003 | Sampath et al. | |
| 2003/0177221 A1 | 9/2003 | Ould-Brahim et al. | |
| 2003/0198182 A1 | 10/2003 | Pegrum et al. | |
| 2003/0200343 A1 | 10/2003 | Greenblat et al. | |
| 2003/0214956 A1 | 11/2003 | Navada et al. | |
| 2003/0215029 A1 | 11/2003 | Limberg | |
| 2003/0223424 A1 | 12/2003 | Anderson et al. | |
| 2003/0223466 A1 | 12/2003 | Noronha, Jr. et al. | |
| 2003/0227943 A1 | 12/2003 | Hallman et al. | |
| 2004/0022263 A1 | 2/2004 | Zhao et al. | |
| 2004/0028060 A1 | 2/2004 | Kang | |
| 2004/0054867 A1 | 3/2004 | Stravers et al. | |
| 2004/0062245 A1 | 4/2004 | Sharp et al. | |
| 2004/0062246 A1 | 4/2004 | Boucher et al. | |
| 2004/0088469 A1 | 5/2004 | Levy | |
| 2004/0128434 A1 | 7/2004 | Khanna et al. | |
| 2004/0141504 A1 | 7/2004 | Blanc | |
| 2004/0179548 A1 | 9/2004 | Chang et al. | |
| 2004/0190547 A1 | 9/2004 | Gordy et al. | |
| 2004/0208177 A1* | 10/2004 | Ogawa | 370/392 |
| 2004/0208181 A1 | 10/2004 | Clayton et al. | |
| 2004/0223502 A1 | 11/2004 | Wybenga et al. | |
| 2004/0235480 A1 | 11/2004 | Rezaaifar et al. | |
| 2004/0264380 A1 | 12/2004 | Kalkunte et al. | |
| 2005/0010630 A1 | 1/2005 | Doering et al. | |
| 2005/0010849 A1 | 1/2005 | Ryle et al. | |
| 2005/0041684 A1 | 2/2005 | Reynolds et al. | |
| 2005/0089049 A1 | 4/2005 | Chang et al. | |
| 2005/0097432 A1 | 5/2005 | Obuchi et al. | |
| 2005/0120122 A1 | 6/2005 | Farnham | |
| 2005/0132132 A1 | 6/2005 | Rosenbluth et al. | |
| 2005/0132179 A1 | 6/2005 | Glaum et al. | |
| 2005/0138276 A1 | 6/2005 | Navada et al. | |
| 2005/0144369 A1 | 6/2005 | Jaspers | |
| 2005/0152324 A1 | 7/2005 | Benveniste | |
| 2005/0152335 A1* | 7/2005 | Lodha et al. | 370/351 |
| 2005/0169317 A1 | 8/2005 | Prueckelmayer | |
| 2005/0175018 A1 | 8/2005 | Wong | |
| 2005/0193316 A1 | 9/2005 | Chen | |
| 2005/0201387 A1 | 9/2005 | Willis | |
| 2005/0226236 A1 | 10/2005 | Klink | |
| 2005/0246508 A1 | 11/2005 | Shaw | |
| 2005/0249124 A1* | 11/2005 | Elie-Dit-Cosaque et al. | 370/242 |
| 2006/0031610 A1 | 2/2006 | Liav et al. | |
| 2006/0034452 A1 | 2/2006 | Tonomura | |
| 2006/0050690 A1 | 3/2006 | Epps et al. | |
| 2006/0077891 A1 | 4/2006 | Smith et al. | |
| 2006/0092829 A1 | 5/2006 | Brolin et al. | |
| 2006/0092929 A1 | 5/2006 | Chun | |
| 2006/0114876 A1 | 6/2006 | Kalkunte | |
| 2006/0146374 A1 | 7/2006 | Ng et al. | |
| 2006/0209685 A1* | 9/2006 | Rahman et al. | 370/229 |
| 2006/0221841 A1 | 10/2006 | Lee et al. | |
| 2007/0038798 A1 | 2/2007 | Bouchard et al. | |
| 2007/0088974 A1 | 4/2007 | Chandwani et al. | |
| 2007/0127464 A1* | 6/2007 | Jain et al. | 370/389 |
| 2007/0179909 A1 | 8/2007 | Channasagara | |
| 2007/0208876 A1 | 9/2007 | Davis | |
| 2007/0253420 A1 | 11/2007 | Chang et al. | |
| 2007/0258475 A1 | 11/2007 | Chinn et al. | |
| 2007/0288690 A1 | 12/2007 | Wang et al. | |
| 2008/0002707 A1 | 1/2008 | Davis | |
| 2008/0031263 A1 | 2/2008 | Ervin et al. | |
| 2008/0037544 A1 | 2/2008 | Yano et al. | |
| 2008/0049742 A1 | 2/2008 | Bansal | |
| 2008/0069125 A1 | 3/2008 | Reed et al. | |
| 2008/0092020 A1 | 4/2008 | Hasenplaugh et al. | |
| 2008/0095169 A1 | 4/2008 | Chandra et al. | |
| 2008/0117075 A1 | 5/2008 | Seddigh et al. | |
| 2008/0181103 A1 | 7/2008 | Davies | |
| 2008/0205407 A1 | 8/2008 | Chang et al. | |
| 2008/0307288 A1 | 12/2008 | Ziesler et al. | |
| 2009/0175178 A1 | 7/2009 | Yoon et al. | |
| 2009/0279423 A1 | 11/2009 | Suresh et al. | |
| 2009/0279440 A1 | 11/2009 | Wong et al. | |
| 2009/0279441 A1 | 11/2009 | Wong et al. | |
| 2009/0279541 A1 | 11/2009 | Wong et al. | |
| 2009/0279546 A1 | 11/2009 | Davis | |
| 2009/0279548 A1 | 11/2009 | Davis et al. | |
| 2009/0279549 A1 | 11/2009 | Ramanathan et al. | |
| 2009/0279558 A1 | 11/2009 | Davis et al. | |
| 2009/0279559 A1 | 11/2009 | Wong et al. | |
| 2009/0279561 A1 | 11/2009 | Chang et al. | |
| 2009/0282148 A1 | 11/2009 | Wong et al. | |
| 2009/0282322 A1 | 11/2009 | Wong et al. | |
| 2009/0287952 A1 | 11/2009 | Patel et al. | |
| 2009/0290499 A1 | 11/2009 | Patel et al. | |
| 2010/0034215 A1 | 2/2010 | Patel et al. | |
| 2010/0135313 A1 | 6/2010 | Davis et al. | |
| 2010/0246588 A1 | 9/2010 | Davis | |
| 2010/0293327 A1 | 11/2010 | Lin et al. | |
| 2011/0002340 A1 | 1/2011 | Davis | |
| 2011/0044340 A1 | 2/2011 | Bansal et al. | |
| 2011/0069711 A1 | 3/2011 | Jha et al. | |

FOREIGN PATENT DOCUMENTS

| | | |
|---|---|---|
| JP | 2003-289359 A | 10/2003 |
| JP | 2004-537871 T | 12/2004 |
| WO | WO 01/84728 A1 | 11/2001 |
| WO | WO 02/41544 A2 | 5/2002 |

OTHER PUBLICATIONS

U.S. Appl. No. 12/505,390, filed Jul. 17, 2009, Patel et al.
Final Office Action for U.S. Appl. No. 10/832,086, mailed on Sep. 29, 2009, 26 pages.
Non-Final Office Action for U.S. Appl. No. 11/831,950, mailed on Aug. 18, 2009, 49 pages.
Non-Final Office Action for U.S. Appl. No. 11/779,714, mailed on Sep. 1, 2009, 58 pages.
Non-Final Office Action for U.S. Appl. No. 10/810,208, mailed on Aug. 24, 2009, 38 pages.
Non-Final Office Action for U.S. Appl. No. 10/140,751, mailed on Sep. 28, 2009, 34 pages.
Notice of Allowance for U.S. Appl. No. 11/000,359, mailed on Sep. 22, 2009, 17 pages.
Notice of Allowance for U.S. Appl. No. 11/118,697, mailed on Sep. 30, 2009, 41 pages.
U.S. Appl. No. 11/828,246, filed Jul. 25, 2007, Davis.
U.S. Appl. No. 11/779,778, filed Jul. 18, 2007, Wong et al.
U.S. Appl. No. 11/779,714, filed Jul. 18, 2007, Wong et al.
U.S. Appl. No. 11/621,038, filed Jan. 8, 2007, Davis et al.
U.S. Appl. No. 11/724,965.
U.S. Appl. No. 11/586,991, filed Oct. 25, 2006, Ramanathan.
U.S. Appl. No. 11/831,950, filed Jul. 31, 2007, Ravindran et al.

U.S. Appl. No. 11/118,697, filed Apr. 28, 2005, Singh.
U.S. Appl. No. 11/953,742, filed Dec. 10, 2007, Wong et al.
U.S. Appl. No. 11/953,743, filed Dec. 10, 2007, Wong et al.
U.S. Appl. No. 11/953,745, filed Dec. 10, 2007, Wong et al.
U.S. Appl. No. 10/141,223, filed May 7, 2002, Veerabadran et al.
U.S. Appl. No. 10/140,753, filed May 6, 2002, Davis et al.
U.S. Appl. No. 10/140,752, filed May 6, 2002, Davis.
U.S. Appl. No. 10/140,751, filed May 6, 2002, Davis et al.
U.S. Appl. No. 10/140,749, filed May 6, 2002, Davis et al.
U.S. Appl. No. 10/139,912, filed May 6, 2002, Davis et al.
U.S. Appl. No. 10/810,208, filed Mar. 26, 2004, Wong et al.
U.S. Appl. No. 10/832,086, filed Apr. 26, 2004, Wong.
Belhadj et al., "Feasibility of a 100GE MAC", IEEE Meeting Nov. 2006, 18 pages.
Braun et al., "Fast incremental CRC updates for IP over ATM networks," IEEE Workshop on High Performance Switching and Routing, 2001, pp. 48-52.
International Search Report of Jun. 17, 2003 for application No. PCT/US03/08719.
10 Gigabit Ethernet—Technology Overview White Paper, Sep. 2001, 16 pages.
10 Gigabit Ethernet Alliance, Interconnection with Wide Area Networks, Version 1.0, Mar. 2002, 5 pages.
Degermark, M., et al., "Small Forwarding Tables for Fast Routing Lookups," *ACM Computer Communications Review*, 27(4):3-14, Oct. 1997.
Foundry Networks, "BigIron Architecture Technical Brief," Oct. 1998—Version 1.0, 15 pages.
Foundry Networks, "BigIron Architecture Technical Brief," Oct. 1998—Version 1.02, 15 pages.
Foundry Networks, "BigIron Architecture Technical Brief," Dec. 1998—Version 1.03, 14 pages.
Foundry Networks, "BigIron Architecture Technical Brief," May 1999—Version 2.0, 15 pages.
Foundry Networks, "BigIron Architecture Technical Brief," May 1999—Version 2.01, 15 pages.
Foundry Networks, "BigIron Architecture Technical Brief," Jul. 2001—Version 2.02, 16 pages.
Foundry Networks, "Foundry Networks, Next Generation Terabit System Architecture—The High Performance Revolution for 10 Gigabit Networks," Nov. 17, 2003.
Gigabit Ethernet Alliance—"Accelerating the Standard for Speed," Copyright 1998, 10 pages.
Kichorowsky et al., "Mindspeed.TM. Switch Fabric Offers the Most Comprehensive Solution for Multi-Protocol Networking Equipment," Apr. 30, 2001, 3 pages.
Matsumoto et al., "Switch Fabrics Touted At Interconnects Conference," Aug. 21, 2000, URL=http://www.eetimes.com/story/OEG20000821S0011, accessed Aug. 12, 2002, 2 pages.
McAuley et al., "Fast Routing Table Lookup Using CAMs," Proceedings of INFOCOM, Mar.-Apr. 1993, pp. 1382-1391.
Foundry Networks, "JetCore™ Based Chassis Systems—An Architecture Brief on NetIron, BigIron, and FastIron Systems," Jan. 17, 2003.
Mier Communications, Inc., "Lab Testing Summary Report—Product Category: Layer-3 Switches, Vendor Tested:, Product Tested: Foundry Networks, BigIron 4000," Report No. 231198, Oct. 1998, 6 pages.
Mier Communications, Inc.,"Lab Testing Summary Report—Product Category: Gigabit Backbone Switches, Vendor Tested: Foundry Networks, Product Tested: BigIron 4000," Report No. 210998, Sep. 1998, 6 pages.
Mindspeed—A Conexant Business, "Switch Fabric Chipset—CX27300 iScale.TM.," Apr. 30, 2001, 2 pages.
Mindspeed—A Conexant Business, "17×17 3.2 Gbps Crosspoint Switch with Input Equalization—M21110," Feb. 1, 2001, 2 pages.
The Tolly Group, "Foundry Networks, Inc.—BigIron 4000, Layer 2 & Layer 3 Interoperability Evaluation," No. 199133, Oct. 1999, 4 pages.
The Tolly Group, "Foundry Networks, Inc.—BigIron 8000 Gigabit Ethernet Switching Router, Layer 2 & Layer 3 Performance Evaluation," No. 199111, May 1999, 4 pages.

Satran et al., "Out of Order Incremental CRC Computation," *IEEE Transactions on Computers*, 54(9): 1178-1181 (Sep. 2005).
Spurgeon, C., "Éthernet, The Definitive Guide," O'Reilly & Associates, Inc., Sebastapol, CA, Feb. 2000.
ANSI/IEEE Standard 802.1D, 1998 Edition (373 pages).
U.S. Appl. No. 12/400,594, filed Mar. 9, 2009, Patel et al.
U.S. Appl. No. 12/400,645, filed Mar. 9, 2009, Patel et al.
U.S. Appl. No. 12/372,390, filed Feb. 17, 2009, Chang et al.
U.S. Appl. No. 12/417,913, filed Apr. 3, 2009, Patel et al.
Final Office Action for U.S. Appl. No. 10/140,751, Mailed Mar. 17, 2009, 17 pages.
Non-Final Office Action for U.S. Appl. No. 11/615,769, Mailed Apr. 15, 2009, 11 pages.
Non-Final Office Action for U.S. Appl. No. 11/621,038, Mailed Apr. 23, 2009, 44 pages.
Non-Final Office Action for U.S. Appl. No. 11/745,008, Mailed May 14, 2009, 27 pages.
Non Final Office Action for U.S. Appl. No. 11/804,977, Mailed Jan. 14, 2008, 13 pages.
Notice of Allowance for U.S. Appl. No. 11/804,977, Mailed Nov. 19, 2008, 17 pages.
Newton, Newton's Telecom Dictionary, CMP Books, Mar. 2004, 20th Ed., p. 617. (Examiner can obtain this reference from the file history of U.S. Appl. No. 09/855,025).
International Preliminary Examination Report for Application No. PCT/US2001/043113, mailed Nov. 6, 2003, 6pages.
Written Opinion of the International Searching Authority for Application No. PCT/US2001/043113, mailed May 1, 2003, 6 pages.
International Search Report for Application No. PCT/US2001/043113, mailed Dec. 13, 2002, 2 pages.
Non-Final Office Action for U.S. Appl. No. 09/855,024. mailed Jun. 4, 2002, 10 pages.
Final Office Action for U.S. Appl. No. 09/855,024, mailed Jan. 15, 2003, 20 pages.
Advisory Action for U.S. Appl. No. 09/855,024, mailed May 2, 2003.
Notice of Allowance for U.S. Appl. No. 09/855,024, mailed Nov. 3, 2003.
Notice of Allowance for U.S. Appl. No. 09/855,024, mailed Dec. 15, 2003. 6 pages.
Non-Final Office Action for U.S. Appl. No. 10/810,301, mailed Mar. 17, 2005,11 pages.
Non-Final Office Action for U.S. Appl. No. 10/810,301, mailed Feb. 16, 2006, 12 pages.
Notice of Allowance for U.S. Appl. No. 10/810,301, mailed Jul. 28, 2006, 5 pages.
Notice of Allowance for U.S. Appl. No. 10/810,301, mailed Feb. 6, 2007, 9 pages.
Non-Final Office Action for U.S. Appl. No. 09/855,025, mailed Nov. 23, 2004, 17 pages.
Non-Final Office Action for U.S. Appl. No. 09/855,031, mailed May 22, 2002.
Non-Final Office Action for U.S. Appl. No. 09/855,031, mailed Dec. 10, 2002.
Final Office Action for U.S. Appl. No. 09/855,031, mailed Jul. 30, 2003.
Notice of Allowance for U.S. Appl. No. 09/855,031, mailed Nov. 4, 2003.
Non-Final Office Action for U.S. Appl. No. 10/736,680, mailed Feb. 16, 2006, 18 pages.
Final Office Action for U.S. Appl. No. 10/736,680, mailed Aug. 3, 2006, 10 pages.
Notice of Allowance for U.S. Appl. No. 10/736,680, mailed Feb. 22, 2007, 12 pages.
Non-Final Office Action for U.S. Appl. No. 10/210,041, mailed Sep. 10, 2003, 12 pages.
Final Office Action for U.S. Appl. No. 10/210,041, mailed Jan. 7, 2004, 14 pages.
Non-Final Office Action for U.S. Appl. No. 10/210,041, mailed Mar. 11, 2004, 12 pages.
Final Office Action for U.S. Appl. No. 10/210,041, mailed Jul. 7, 2004, 13 pages.
Non-Final Office Action for U.S. Appl. No. 10/210,041, mailed Feb. 9, 2005, 7 pages.

Final Office Action for U.S. Appl. No. 10/210,041, mailed Aug. 24, 2005, 7 pages.
Advisory Action for U.S. Appl. No. 10/210,041, mailed Dec. 13, 2005, 4 pages.
Non-Final Office Action for U.S. Appl. No. 10/210,108, mailed Jun. 12, 2003, 6 pages.
Notice of Allowance for U.S. Appl. No. 10/210,108, mailed Oct. 7, 2003.
Requirement for Restriction/Election for U.S. Appl. No. 10/438,545, mailed Oct. 31, 2003.
Non-Final Office Action for U.S. Appl. No. 10/438,545, mailed Dec. 12, 2003, 7 pages.
Notice of Allowance for U.S. Appl. No. 10/438,545, mailed Jun. 15, 2004, 4 pages.
Non-Final Office Action for U.S. Appl. No. 11/611,067, mailed Feb. 20, 2009, 11 pages.
Non-Final Office Action for U.S. Appl. No. 10/832,086, mailed Sep. 19, 2007, 12 pages.
Final Office Action for U.S. Appl. No. 10/832,086, mailed May 1, 2008, 31 pages.
Advisory Action for U.S. Appl. No. 10/832,086, mailed Jul. 21, 2008, 4 pages.
Non-Final Office Action for U.S. Appl. No. 10/832,086, mailed Sep. 18, 2008, 18 pages.
Non-Final Office Action for U.S. Appl. No. 11/586,991, mailed Oct. 2, 2008, 23 pages.
Non-Final Office Action for U.S. Appl. No. 10/810,208, mailed Jul. 16, 2007, 24 pages.
Non-Final Office Action for U.S. Appl. No. 10/810,208, mailed Dec. 18, 2007, 40 pages.
Final Office Action for U.S. Appl. No. 10/810,208, mailed Jun. 11, 2008, 34 pages.
Advisory Action for U.S. Appl. No. 10/810,208, mailed Aug. 27, 2008, 4 pages.
Non-Final Office Action for U.S. Appl. No. 10/810,208, mailed Feb. 13, 2009, 17 pages.
Requirement for Restriction/Election for U.S. Appl. No. 10/140,752, mailed May 18, 2006, 8 pages.
Non-Final Office Action for U.S. Appl. No. 10/140,752, mailed Dec. 14, 2006, 17 pages.
Non-Final Office Action for U.S. Appl. No. 10/140,752, mailed Apr. 23, 2007, 6 pages.
Non-Final Office Action for U.S. Appl. No. 10/140,752, mailed Jan. 24, 2008, 8 pages.
Notice of Allowance of U.S. Appl. No. 10/140,752, mailed Jul. 24, 2008, 14 pages.
Notice of Allowance of U.S. Appl. No. 10/140,752, mailed Sep. 10, 2008, 4 pages.
Non-Final Office Action for U.S. Appl. No. 11/854,486, mailed Jul. 20, 2009, 29 pages.
Non-Final Office Action for U.S. Appl. No. 10/139,912, mailed Jan. 25, 2006, 14 pages.
Final Office Action for U.S. Appl. No. 10/139,912, mailed Aug. 11, 2006, 26 pages.
Non-Final Office Action for U.S. Appl. No. 10/139,912, mailed Apr. 20, 2007, 20 pages.
Final Office Action for U.S. Appl. No. 10/139,912, mailed Nov. 28, 2007, 20 pages.
Non-Final Office Action for U.S. Appl. No. 10/139,912, mailed Aug. 1, 2008, 21 pages.
Notice of Allowance for U.S. Appl. No. 10/139,912, mailed Feb. 5, 2009, 8 pages.
Notice of Allowance for U.S. Appl. No. 10/139,912, mailed Jun. 8, 2009, 8 pages.
Requirement for Restriction/Election for U.S. Appl. No. 10/140,751, mailed Apr. 27, 2006, 5 pages.
Non-Final Office Action for U.S. Appl. No. 10/140,751, mailed Aug. 10, 2006, 15 pages.
Final Office Action for U.S. Appl. No. 10/140,751, mailed Apr. 10, 2007, 16 pages.
Non-Final Office Action for U.S. Appl. No. 10/140,751, mailed Oct. 30, 2007, 14 pages.
Final Office Action for U.S. Appl. No. 10/140,751, mailed May 28, 2008, 19 pages.
Non-Final Office Action for U.S. Appl. No. 10/140,751, mailed Sep. 17, 2008, 15 pages.
Advisory Action for U.S. Appl. No. 10/140,751, mailed Jun. 1, 2009, 3 pages.
Non-Final Office Action for U.S. Appl. No. 10/141,223, mailed Feb. 23, 2006, 25 pages.
Non-Final Office Action for U.S. Appl. No. 10/141,223, mailed Feb. 13, 2007, 29 pages.
Final Office Action for U.S. Appl. No. 10/141,223, mailed Aug. 21, 2007, 25 pages.
Non-Final Office Action for U.S. Appl. No. 10/141,223, mailed Dec. 28, 2007, 13 pages.
Non-Final Office Action for U.S. Appl. No. 10/141,223, mailed Sep. 3, 2008, 22 pages.
Non-Final Office Action for U.S. Appl. No. 10/139,831, mailed Oct. 17, 2005, 7 pages.
Notice of Allowance for U.S. Appl. No. 10/139,831, mailed Feb. 9, 2006, 7 pages.
Non-Final Office Action for U.S. Appl. No. 10/139,831, mailed Jun. 27, 2006, 9 pages.
Final Office Action for U.S. Appl. No. 10/139,831, mailed Nov. 28, 2006, 17 pages.
Notice of Allowance for U.S. Appl. No. 10/139,831, mailed Jun. 14, 2007, 26 pages.
Notice of Allowance for U.S. Appl. No. 10/139,831, mailed Jun. 26, 2007, 25 pages.
Non-Final Office Action for U.S. Appl. No. 11/828,246, mailed Jun. 15, 2009, 26 pages.
Non-Final Office Action for U.S. Appl. No. 10/140,088, mailed Apr. 27, 2006, 13 pages.
Notice of Allowance for U.S. Appl. No. 10/140,088, mailed Sep. 7, 2006, 13 pages.
Notice of Allowance for U.S. Appl. No. 10/140,088, mailed Oct. 24, 2006, 8 pages.
Notice of Allowance for U.S. Appl. No. 10/140,088, mailed Jan. 11, 2007, 5 pages.
Non-Final Office Action for U.S. Appl. No. 10/140,749, mailed Aug. 10, 2006, 22 pages.
Final Office Action for U.S. Appl. No. 10/140,749, mailed Jun. 27, 2007, 23 pages.
Final Office Action for U.S. Appl. No. 10/140,749, mailed Jan. 8, 2008, 23 pages.
Non-Final Office Action for U.S. Appl. No. 10/140,749, mailed Jun. 6, 2008, 28 pages.
Final Office Action for U.S. Appl. No. 10/140,749, mailed Dec. 8, 2008, 30 pages.
Non-Final Office Action for U.S. Appl. No. 10/140,749, mailed May 27, 2009, 38 pages.
Non-Final Office Action for U.S. Appl. No. 10/140,753, mailed Apr. 20, 2006, 11 pages.
Final Office Action for U.S. Appl. No. 10/140,753, mailed Jan. 10, 2007, 27 pages.
Non-Final Office Action for U.S. Appl. No. 10/140,753, mailed Aug. 22, 2007, 14 pages.
Non-Final Office Action for U.S. Appl. No. 10/140,753, mailed Jan. 8, 2008, 14 pages.
Final Office Action for U.S. Appl. No. 10/140,753, mailed Aug. 25, 2008, 22 pages.
Requirement for Restriction/Election for U.S. Appl. No. 11/000,359, mailed Jun. 20, 2008, 7 pages.
Non-Final Office Action for U.S. Appl. No. 11/000,359, mailed Oct. 23, 2008, 28 pages.
Non-Final Office Action for U.S. Appl. No. 11/000,359, mailed May 29, 2009, 14 pages.
Requirement for Restriction/Election for U.S. Appl. No. 11/118,697, mailed Jun. 2, 2009, 8 pages.
Non-Final Office Action for U.S. Appl. No. 09/855,038, mailed Jun. 2, 2005, 14 pages.
Final Office Action for U.S. Appl. No. 09/855,038, mailed Feb. 7, 2006, 8 pages.

Non-Final Office Action for U.S. Appl. No. 09/855,038, mailed Oct. 4, 2006, 14 pages.
Notice of Allowance for U.S. Appl. No. 09/855,038, mailed Apr. 26, 2007, 8 pages.
Requirement for Restriction/Election for U.S. Appl. No. 09/988,066, mailed Dec. 13, 2005, 7 pages.
Non-Final Office Action for U.S. Appl. No. 09/988,066, mailed Jul. 14, 2006, 17 pages.
Non-Final Office Action for U.S. Appl. No. 09/988,066, mailed Apr. 6, 2007, 22 pages.
Final Office Action for U.S. Appl. No. 09/988,066, mailed Oct. 31, 2007, 16 pages.
Advisory Action for U.S. Appl. No. 09/988,066, mailed May 28, 2008, 4 pages.
Notice of Allowance for U.S. Appl. No. 09/988,066, mailed Oct. 30, 2008, 16 pages.
Non-Final Office Action for U.S. Appl. No. 09/855,015, mailed Oct. 28, 2004, 12 pages.
Non-Final Office Action for U.S. Appl. No. 09/855,015, mailed Jan. 12, 2006, 6 pages.
Notice of Allowance for U.S. Appl. No. 09/855,015, mailed Sep. 8, 2006, 3 pages.
Requirement for Restriction/Election for U.S. Appl. No. 09/855,015, mailed Nov. 3, 2006, 6 pages.
Notice of Allowance for U.S. Appl. No. 09/855,015, mailed Jan. 7, 2008, 4 pages.
Supplemental Notice of Allowance for U.S. Appl. No. 09/855,015, mailed Feb. 4, 2008, 3 pages.
Notice of Allowance for U.S. Appl. No. 09/988,066, Mailed Jan. 9, 2009, 13 pages.
Non-Final Office Action for U.S. Appl. No. 11/668,322, Dated Mar. 23, 2009, 19 pages.
Non-Final Office Action for U.S. Appl. No. 10/832,086, Mailed Apr. 1, 2009, 17 pages.
Advisory Action for U.S. Appl. No. 11/831,950, mailed on Mar. 4, 2010, 4 pages.
Non-Final Office Action for U.S. Appl. No. 11/779,714, mailed on Mar. 31, 2010, 26 pages.
Non-Final Office Action for U.S. Appl. No. 10/810,208, mailed on Feb. 5, 2010, 13 pages.
Final Office Action for U.S. Appl. No. 11/668,322, mailed on Feb. 24, 2010, 33 pages.
Final Office Action for U.S. Appl. No. 10/140,751, mailed on Mar. 25, 2010, 29 pages.
U.S. Appl. No. 12/639,762, filed Dec. 16, 2009, Singh.
U.S. Appl. No. 12/639,749, filed Dec. 16, 2009, Singh.
U.S. Appl. No. 12/624,300, filed Nov. 23, 2009, Davis et al.
U.S. Appl. No. 12/608,985, filed Oct. 29, 2009, Wong.
U.S. Appl. No. 12/608,972, filed Oct. 29, 2009, Wong.
Final Office Action for U.S. Appl. No. 11/831,950, mailed on Jan. 6, 2010, 21 pages.
Non-Final Office Action for U.S. Appl. No. 11/953,742, mailed on Nov. 19, 2009, 51 pages.
Non-Final Office Action for U.S. Appl. No. 11/953,743, mailed on Nov. 23, 2009, 47 pages.
Non-Final Office Action for U.S. Appl. No. 11/953,745, mailed on Nov. 24, 2009, 48 pages.
Requirement for Restriction/Election for U.S. Appl. No. 11/668,322, mailed on Oct. 29, 2009, 6 pages.
Non-Final Office Action for U.S. Appl. No. 11/854,486, mailed on Jan. 12, 2010, 23 pages.
Notice of Allowance for U.S. Appl. No. 10/139,912, mailed on Oct. 19, 2009, 17 pages.
Supplemental Notice of Allowance for U.S. Appl. No. 10/139,912, mailed on Nov. 23, 2009, 4 pages.
Final Office Action for U.S. Appl. No. 11/745,008, mailed on Dec. 30, 2009, 27 pages.
Notice of Allowance for U.S. Appl. No. 11/828,246, mailed on Nov. 16, 2009, 20 pages.
Final Office Action for U.S. Appl. No. 11/621,038, mailed on Dec. 23, 2009, 27 pages.
Non-Final Office Action for U.S. Appl. No. 12/198,697, mailed on Feb. 2, 2010, 50 pages.
Final Office Action for U.S. Appl. No. 10/140,749, mailed on Jan. 13, 2010, 44 pages.
Final Office Action for U.S. Appl. No. 11/611,067, mailed on Oct. 16, 2009, 35 pages.
Non-Final Office Action for U.S. Appl. No. 11/611,067, mailed on Dec. 8, 2009, 11 pages.
Final Office Action for U.S. Appl. No. 11/615,769, mailed on Jan. 22, 2010, 34 pages.
Final Office Action for U.S. Appl. No. 11/779,714, mailed on Nov. 9, 2010, 24 pages.
U.S. Appl. No. 12/880,518, filed Sep. 13, 2010, Wong.
U.S. Appl. No. 12/883,073, filed Sep. 15, 2010, Davis.
U.S. Appl. No. 12/900,279, filed Oct. 7, 2010, Bansal et al.
Non-Final Office Action for U.S. Appl. No. 10/140,751, mailed Dec. 20, 2010, 23 pages.
Requirement for Restriction/Election for U.S. Appl. No. 12/639,749, mailed on Dec. 7, 2010, 3 pages.
Notice of Allowance for U.S. Appl. No. 12/400,645, mailed on Jan. 26, 2011, 14 pages.
Final Office Action for U.S. Appl. No. 12/070,893, mailed on Nov. 24, 2010, 11 pages.
Final Office Action for U.S. Appl. No. 11/953,742, mailed on Jun. 14, 2010, 21 pages.
Final Office Action for U.S. Appl. No. 11/953,743, mailed on Jul. 15, 2010, 21 pages.
Non-Final Office Action for U.S. Appl. No. 11/953,745, mailed on Jun. 14, 2010, 19 pages.
Notice of Allowance for U.S. Appl. No. 10/810,208, mailed on Jul. 15, 2010, 15 pages.
Non-Final Office Action for U.S. Appl. No. 11/668,322, mailed on Jun. 22, 2010, 16 pages.
Notice of Allowance for U.S. Appl. No. 11/854,486, mailed on Jul. 13, 2010, 12 pages.
Advisory Action for U.S. Appl. No. 11/745,008, mailed on Apr. 21, 2010, 8 pages.
Notice of Allowance for U.S. Appl. No. 11/621,038, mailed on Apr. 28, 2010, 15 pages.
Non-Final Office Action for U.S. Appl. No. 12/400,594, mailed on May 14, 2010, 53 pages.
Non-Final Office Action for U.S. Appl. No. 12/372,390, mailed on Apr. 22, 2010, 46 pages.
Non-Final Office Action for U.S. Appl. No. 12/070,893, mailed on Jun. 10, 2010, 44 pages.
Advisory Action for U.S. Appl. No. 11/615,769, mailed on May 25, 2010, 3 pages.
Notice of Allowance for U.S. Appl. No. 11/615,769, mailed on Jul. 12, 2010, 14 pages.
"Ethernet now offers the most comprehensive OAM for packet-based solutions," Nortel, White Paper, Copyright 2006, 6 pages.
U.S. Appl. No. 12/795,492, filed Jun. 7, 2010, Davis et al.
U.S. Appl. No. 12/702,031, filed Feb. 8, 2010, Davis.
U.S. Appl. No. 12/466,277, filed May 14, 2009, Lin.
Katz, et al., "Generic Application of BFD draft-ietf-bfd-generic-03.txt," Network Working Group, Internet Draft, Mar. 2007, 15 pages—(Printed from URL:http://www.ietf.org/internet-drafts/draft-ietf-bfd-generic-03.txt, Aug. 7, 2007).
Katz, et al., "Bidirectional Forwarding Detection draft-ietf-bfd-base-06.txt," Network Working Group, Internet Draft, Mar. 2007, 45 pages—(Printed from URL:http://www.ietf.org/internet-drafts/draft-ietf-bfd-base-06.txt, Aug. 7, 2007).
"OAM—Operations, Administration and Maintenance," World Wide Packets, White Paper, Copyright 206, 12 pages.
Final Office Action for U.S. Appl. No. 12/198,697, mailed on Aug. 2, 2010, 55 pages.
Non-Final Office Action for U.S. Appl. No. 12/639,762, mailed on Sep. 1, 2010, 40 pages.
Non-Final Office for U.S. Appl. No. 12/400,645, mailed on Sep. 1, 2010, 45 pages.
Non-Final Office Action for U.S. Appl. No. 12/372,390, mailed on Sep. 13, 2010, 10 pages.
U.S. Appl. No. 12/198,710, filed Aug. 26, 2008, Zhang et al.
Non-Final Office Action for U.S. Appl. No. 11/646,845, mailed on Oct. 4, 2010, 48 pages.

Non-Final Office Action for U.S. Appl. No. 12/198,697, mailed on Oct. 25, 2010, 36 pages.
Non-Final Office Action for U.S. Appl. No. 12/198,710, mailed on Sep. 28, 2010, 15 pages.
Final Office Action for U.S. Appl. No. 12/400,594, mailed on Oct. 28, 2010, 13 pages.
Non-Final Office Action for U.S. Appl. No. 12/505,390, mailed on Oct. 28, 2010, 51 pages.
Final Office Action for U.S. Appl. No. 11/646,845, mailed on Jun. 9, 2011, 22 pages.
Notice of Allowance for U.S. Appl. No. 11/953,743, mailed on Apr. 28, 2011, 19 pages.
Notice of Allowance for U.S. Appl. No. 11/779,778, mailed on Jul. 28, 2011, 9 pages.
Final Office Action for U.S. Appl. No. 10/140,751, mailed on Jun. 28, 2011, 23 pages.
Non-Final Office Action for U.S. Appl. No. 12/702,031, mailed on Apr. 29, 2011, 5 pages.
Final Office Action for U.S. Appl. No. 12/795,492, mailed Jul. 20, 2011, 11 pages.
Non-Final Office Action for U.S. Appl. No. 12/198,697, mailed on May 20, 2011, 43 pages.
Requirement for Restriction/Election for U.S. Appl. No. 12/466,277, mailed on Aug. 9, 2011, 6 pages.
Non-Final Office Action for U.S. Appl. No. 11/953,742, mailed on Mar. 30, 2011, 23 pages.
Non-Final Office Action for U.S. Appl. No. 11/779,778, mailed on Feb. 2, 2011, 63 pages.
Final Office Action for U.S. Appl. No. 11/668,322, mailed on Feb. 1, 2011, 17 pages.
Non-Final Office Action for U.S. Appl. No. 12/795,492, mailed on Mar. 17, 2011, 51 pages.
Non-Final Office Action for U.S. Appl. No. 12/198,710, mailed on Mar. 24, 2011, 40 pages.
Notice of Allowance for U.S. Appl. No. 12/639,749, mailed on Feb. 11, 2011, 51 pages.
Notice of Allowance for U.S. Appl. No. 12/639,762, mailed on Mar. 4, 2011, 7 pages.
Notice of Allowance for U.S. Appl. No. 12/400,594, mailed on Mar. 23, 2011, 11 pages.
Notice of Allowance for U.S. Appl. No. 12/372,390, mailed on Mar. 9, 2011, 8 pages.
Non-Final Office Action for U.S. Appl. No. 12/070,893, mailed on Mar. 18, 2011, 7 pages.
Non-Final Office Action for U.S. Appl. No. 11/646,845, mailed on Oct. 14, 2011, 19 pages.
Final Office Action for U.S. Appl. No. 11/953,742, mailed on Oct. 26, 2011, 19 pages.
Non-Final Office Action for U.S. Appl. No. 11/745,008, mailed on Sep. 14, 2011, 26 pages.
Notice of Allowance for U.S. Appl. No. 12/795,492, mailed on Nov. 14, 2011, 10 pages.
Final Office Action for U.S. Appl. No. 12/198,710, mailed on Oct. 19, 2011, 58 pages.
Final Office Action for U.S. Appl. No. 12/070,893, mailed on Sep. 21, 2011, 12 pages.
Notice of Allowance for U.S. Appl. No. 12/466,277, mailed on Nov. 2, 2011, 47 pages.
Notice of Allowance for U.S. Appl. No. 11/668,322, mailed Feb. 10, 2012, 20 pages.
Notice of Allowance for U.S. Appl. No. 12/198,697, mailed Nov. 28, 2011, 12 pages.
Notice of Allowance for U.S. Appl. No. 12/198,697, mailed Jan. 5, 2012, 4 pages.

* cited by examiner

| Bits | 0 1 2 3 4 5 6 7 | 0 1 2 3 4 5 6 7 | 0 1 2 3 4 5 6 7 | 0 1 2 3 4 5 6 7 |
|---|---|---|---|---|
| Version | Diag | STA | P F C A D R | Detect Multiple | Length |
| My Discriminator ||||
| Your Discriminator ||||
| Desired Min TX Interval ||||
| Desired Min RX Interval ||||
| Required Min Echo RX Interval ||||

PACKETS FROM VPLS/VLL UPLINK

| HEADER | INTERNAL HEADER 16 BYTES | DEST MAC 6 BYTES | SRC MAC 6 BYTES | ETYPE 2 BYTES 0x8847 | MPLS STACK 4-8 BYTES | INNER DST MAC 6 BYTES | INNER SRC MAC 6 BYTES | ETYPE 2 BYTES 0x8902 | 802.1AG DATA |

PACKET FROM REGULAR LINK

| HEADER | INTERNAL HEADER 16 BYTES | DEST MAC 6 BYTES | SRC MAC 6 BYTES | ETYPE 2 BYTES 0x8847 | 802.1AG DATA |

| 802.1AG DATA | BYTE |
|---|---|
| MD LEVEL (HIGH 3 BITS) VERSION (LOW 5 BITS) | 1 |
| OPCODE (CCM IS 1) | 2 |
| FLAGS | 3 |
| FIRST TLV OFFSET (70 FOR CCM) | 4 |
| SEQUENCE NUMBER | 5-8 |
| MEP ID | 9-10 |
| MAID | 11-58 |
| RESERVED | 59-74 |
| OPTIONAL CCM TLVs | 75 |

802.1AG PACKET REFERENCE TABLE — 1500

| # | |
|---|---|
| 0 | ETYPE 1 (2-BYTES) \| ETYPE 2 OPTION {CHECK, OFFSET [6:0]} (1-BYTE) \| ETYPE 2 (2-BYTES) \| ETYPE 3 OPTION {CHECK, OFFSET [6:0]} (1-BYTE) \| SMAC OPTION {CHECK, OFFSET [6:0]} (1-BYTE) |
| 1 | |
| 2 | |
| 3 | |
| 4 | |

TECHNIQUES FOR USING DUAL MEMORY STRUCTURES FOR PROCESSING FAILURE DETECTION PROTOCOL PACKETS

CROSS-REFERENCES TO RELATED APPLICATIONS

The present application claims the benefit and priority under 35 U.S.C. 119(e) from U.S. Provisional Application No. 60/880,074 filed Jan. 11, 2007 entitled TIMING SENSITIVE PROTOCOL PACKET HARDWARE ASSIST, the entire contents of which are herein incorporated by reference for all purposes.

The present application also incorporates by reference for all purposes the entire contents of the following applications filed concurrently with the present application:

(1) U.S. Non-Provisional Application No. 11/953,742, filed Dec. 10, 2007, titled TECHNIQUES FOR PROCESSING INCOMING FAILURE DETECTION PROTOCOL PACKETS;

(2) U.S. Non-Provisional Application No. 11/953,743, filed Dec. 10, 2007, now U.S. Pat. No. 7,978,614, issued Jul. 12, 2011, titled TECHNIQUES FOR DETECTING NON-RECEIPT OF FAULT DETECTION PROTOCOL PACKETS; and (3) U.S. Non-Provisional Application No. 11/953,745, filed Dec. 10, 2007, titled TECHNIQUES FOR TRANSMITTING FAILURE DETECTION PROTOCOL PACKETS.

BACKGROUND OF THE INVENTION

The present application relates to networking technologies and more particularly to techniques for using dual memory structures for processing failure detection protocol packets.

The ability to detect communication failures is an important aspect of any networking environment. Networks use several different mechanisms to detect failures. For example, several different failure detection protocols (FDP) are used that enable detection of failures in a networking environment. Examples of FDPs include "hello" protocols, "keep alive" protocols, various Organization Administration and Maintenance (OAM) protocols, and others.

Network devices (e.g., routers, switches) in a network using a failure detection protocol are generally configured to continuously transmit FDP packets at regular intervals. A network device in the network receives FDP packets transmitted by other network devices in the network and uses the periodically received packets to ascertain the health of the other devices and the network connections. For example, if a network device does not receive an FDP packet within a period of time associated with the FDP packet, then the network device may assume that there is a network failure somewhere in the network that prevented the expected FDP packet from reaching the network device. The network device itself also transmits FDP packets on a periodic basis.

A network device may receive and transmit different types of FDP packets and may be involved in one or more FDP sessions at a time. Each transmitted FDP packet comprises an identifier identifying a unique FDP session for which the packet has been transmitted.

Traditionally, FDP-related processing in a network device is performed by software executed by a CPU or processor of the network device. For example, a processor of a network device executing software configured for FDP packets processing is configured to process FDP packets received by the network device from other network devices and handle transmission of FDP at regular intervals from the network device.

In older failure detection protocols, the periodic time intervals associated with FDP protocols were generally in the range of seconds such as 1 second, 5 seconds, 10 seconds, 20 seconds, and the like. Such a time interval allowed sufficient time for the software running on the CPU to handle processing of the incoming FDP packets and also to process transmission of the FDP packets within the periodic time interval without detrimentally affecting the performance of the CPU or overwhelming the CPU. However, due to the large periodic interval time values, the time required to detect network failures is also quite large (usually several seconds). While this was acceptable in the past, it is no longer acceptable in today's larger and faster networks wherein a long failure detection time translates to large amounts of data being lost at today's fast networking speeds (e.g., at gigabit speeds).

In order to reduce failure detection times, today's networks typically use newer fault detection protocols with significantly shorter periodic time intervals that dramatically reduce the failure detection times. Examples of such newer FDPs include OAM protocols such as Bidirectional Forwarding (BFD) protocol which is used to detect router link failures and the 802.1ag standard that specifies protocols, procedures, and managed objects to support transport fault management. The periodic time intervals associated with these new FDPs is usually in the order of milliseconds (msecs) or even faster.

While these new protocols reduce failure detection times, they create an undue burden on a network device that is configured to handle processing of the FDP packets. As a result of the dramatically shorter periodic time intervals, a network device has to periodically transmit FDP packets in the order of milliseconds (msecs) or even faster, which is much faster than transmission processing done previously by network device for older FDPs. Due to the faster transmission rates, the number and rate at which FDP packets are received by a network device is also much faster than in the past. As a result, more CPU cycles per unit time are needed on the network device to perform FDP packets processing, including transmission of FDP packets and processing of incoming FDP packets. However, processors in conventional network devices executing software for processing the FDP packets are unable to cope up with the processing of newer FDP packets. As a result, conventional network devices are unable to handle and support the newer failure detection protocols.

BRIEF SUMMARY OF THE INVENTION

Embodiments of the present invention provide techniques that assist in processing of failure detection protocol (FDP) packets. Techniques are provided that assist a CPU of a network device in processing incoming FDP packets. In one embodiment, only a subset of FDP packets received by the network device is forwarded to the CPU for processing, the other FDP packets are dropped and not forwarded to the CPU. The processing is performed using dual memory structures that enable receipt of FDP packets by the network device to be decoupled from the processing of FDP packets by the CPU of the network device.

In one embodiment, techniques are provided that enable a network device to process FDP packets received by the network device. The network device may comprise a processor configured to execute software for processing FDP packets and a module. A first memory structure is provided for storing information related to FDP packets received by the network device, wherein the information in the first memory structure is processed by the module, the first memory structure enabling the FDP packets received by the network device to be processed by the module independent from processing performed by the processor. A second memory structure is provided for storing information related to one or more FDP packets received by the network device and that are to be processed by the processor, wherein information in the second memory structure is processed by the processor, the second memory structure enabling the processor to perform processing independent of a frequency at which FDP packets are received by the network device. Upon receiving a first FDP packet at the network device, an entry in the first memory structure is stored for the first FDP packet. Using the entry in the first memory structure, it is determined that the first FDP packet need not be forwarded to the processor. The first FDP packet subsequently dropped such that the first FDP packet is not forwarded to the processor. In one embodiment, the first memory structure and the second memory structure are implemented as linked lists.

In one embodiment, the network device may receive a second FDP packet at the network device. An entry is stored in the first memory structure for the second FDP packet. Using the entry in the first memory structure for the second FDP packet, it is determined that the second FDP packet needs to be forwarded to the processor. The second FDP packet is subsequently forwarded to the processor.

In one embodiment, forwarding the second FDP packet to the processor of the network device may comprise storing information in an entry in the second memory structure for the second FDP packet that enables the processor to access the second FDP packet using the entry in the second memory structure. For example, in one embodiment, the second FDP packet may be stored in a buffer memory and the entry in the first memory structure for the second FDP packet may comprise a pointer pointing to a location of the second FDP packet in the buffer memory. In this embodiment, forwarding the second FDP packet to the processor may comprise storing a pointer in an entry in the second memory structure that points to the location of the second FDP packet in the buffer memory.

Examples of FDPs include Bidirectional Forwarding (BFD), 802.1 ag packet, and others.

The foregoing, together with other features, embodiments, and advantages of the present invention, will become more apparent when referring to the following specification, claims, and accompanying drawings.

BRIEF DESCRIPTION OF THE DRAWINGS

FIGS. 13A and 13B depict formats for two types of 802.1 ag packets that may be processed by an embodiment of the present invention;

FIG. 14 depicts contents of an 802.1 ag packet data section;

FIG. 15 depicts an 802.1 ag packet reference table according to an embodiment of the present invention;

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques that assist in processing of failure detection protocol (FDP) packets. Techniques are provided that assist a CPU of a network device in processing incoming FDP packets. A failure detection protocol (or FDP) is intended to include any protocol, standard, procedure, or method in which packets are transmitted at periodic intervals for purposes of monitoring, detecting, or identifying a failure in a network. A packet transmitted according to an FDP is referred to as an FDP packet. Examples of FDPs that may be supported by embodiments of the present invention include OAM protocols such as Bidirectional Forwarding (BFD) protocol which is used to detect router link failures and the 802.1 ag standard that specifies protocols, procedures, and managed objects to support transport fault management.

Figure 1:
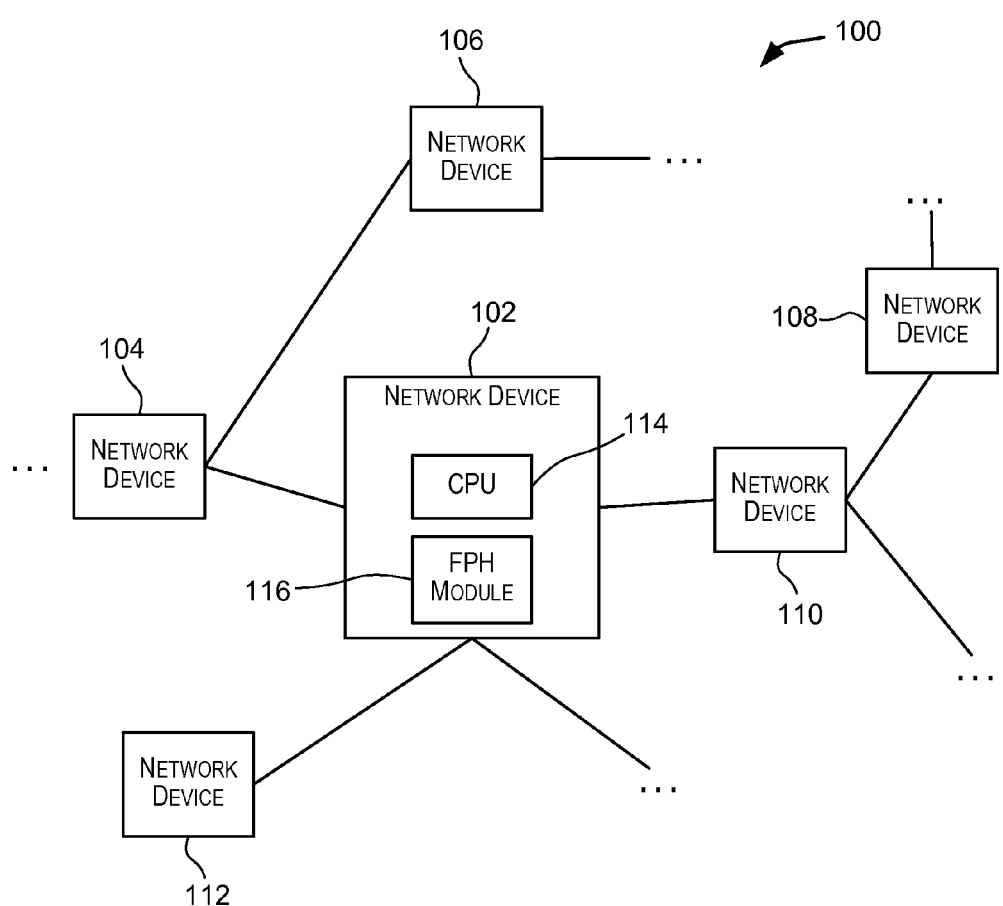
FIG. 1 is a simplified diagram of a portion of a network that may incorporate an embodiment of the present invention.

FIG. 1 is a simplified diagram of a portion of a network 100 that may incorporate an embodiment of the present invention. The portion of network 100 depicted in FIG. 1 comprises a number of network devices 102, 104, 106, 108, 110, and 112 coupled to one another via communication links. A network device may be any device capable of receiving and/or transmitting data in a network. The communication links may be wired links or wireless links. Different protocols may be used to communicate data between the various network devices.

The network devices depicted in FIG. 1 may use one or more types of failure detection protocols (FDPs) to facilitate detection of failures in network 100. The FDPs used may include OAM protocols such as BFD and 802.1 ag, and others. A network device may be involved in one or more FDP sessions. For each FDP session, the network device may be configured to continuously transmit FDP packets at a periodic time interval associated with that FDP session. A network device may also receive FDP packets transmitted by other devices in the network. The periodic time intervals at which FDP packets are received or transmitted may vary from one FDP session to another depending on the type of FDP session. The periodic time intervals may be in the order of one or more milliseconds (msecs), one or more seconds, or other faster or slower time intervals.

In accordance with an embodiment of the present invention, a network device 102 may be configured to receive FDP packets for one or more FDP sessions from other network devices. Network device 102 may also transmit FDP packets at periodic intervals for one or more FDP sessions to other devices in the network. The time intervals at which the packets are received and transmitted may vary from session to session and may be in the order of one or more milliseconds (as required by the newer FDPs) to seconds, or even faster or slower intervals. Network device 102 may be configured to ascertain the health of the other devices and the network connections based upon the FDP packets received by network device 102. For example, if network device 102 does not receive an FDP packet for an FDP session within a preconfigured time interval for that session, then network device 102 may assume that there is a network failure somewhere in the network that prevented the expected FDP packets from reaching network device 102 for the session. Network device itself may transmit FDP packets at periodic intervals for one or more FDP sessions.

As depicted in FIG. 1, network device 102 comprises a processor or CPU 114 and an FDP Packet Handler (FPH) module 116. CPU 114 is configured to execute software for performing various tasks performed by network device 102. In one embodiment, CPU 114 executes software (e.g., program, code, instructions, etc.) that is configured to handle processing of FDP packets. According to an embodiment of the present invention, FPH module 116 assists CPU 114 in FDP packets-related processing, including processing of incoming FDP packets and transmission of FDP packets. FPH module 116 may be implemented as a field programmable logic device (FPLD) such as a programmed field-programmable gate array (FPGA) device or an ASIC.

In one embodiment, FPH module 116 is configured to filter FDP packets received by network device 102 and bound for CPU 114 such that only a subset of received FDP packets are forwarded to CPU 114 for processing, the other FDP packets are dropped by FPH module 116 and not forwarded to CPU 114. In one embodiment, FPH module 116 receives CPU-bound packets and identifies FDP packets from other CPU-bound packets. For a packet identified as an FDP packet, FPH module 116 determines whether the packet needs to be sent to CPU 114. If FPH module 116 determines that the FDP packet need not be forwarded to CPU 114, the FDP packet is dropped and not sent to CPU 114, thereby relieving CPU 114 from having to process the packet. An FDP packet is forwarded to CPU 114 only if FPH module 116 determines that the packet cannot be consumed by FPH module 116 and needs to be forwarded to CPU 114 for inspection. In this manner, only a small subset of FDP packets received by network device 102 is forwarded to CPU 114 for processing. This reduces the amount of processing that CPU 114 has to do to process FDP packets received by network device 102.

FPH module 116 is also configured to assist in transmission of FDP packets from network device 102. For each FDP session in which network device 102 participates, FDP packets for that session are transmitted from network device 102 at periodic time intervals associated with the FDP for that session. The time intervals may be different for different FDP sessions. In this manner, the task of transmitting FDP packets is partially or completely offloaded from CPU 114 of network device 102.

By assisting in processing of incoming FDP packets, FPH module 116 reduces the number of incoming FDP packets that CPU 114 has to process, thereby freeing CPU cycles for other tasks performed by CPU 114. FPH module 116 also offloads the task of transmitting FDP packets from CPU 114. In this manner, the amount of FDP packets-related processing that CPU 114 has to perform is reduced. This enables network device 102 to support various FDPs including FDPs with shorter periodic interval requirements (e.g., periodic time intervals measured in milliseconds or even faster). Network device 102 comprising a FPH module 116 may coexist in a network with other network devices that may or may not comprise FPH modules.

Figure 2:
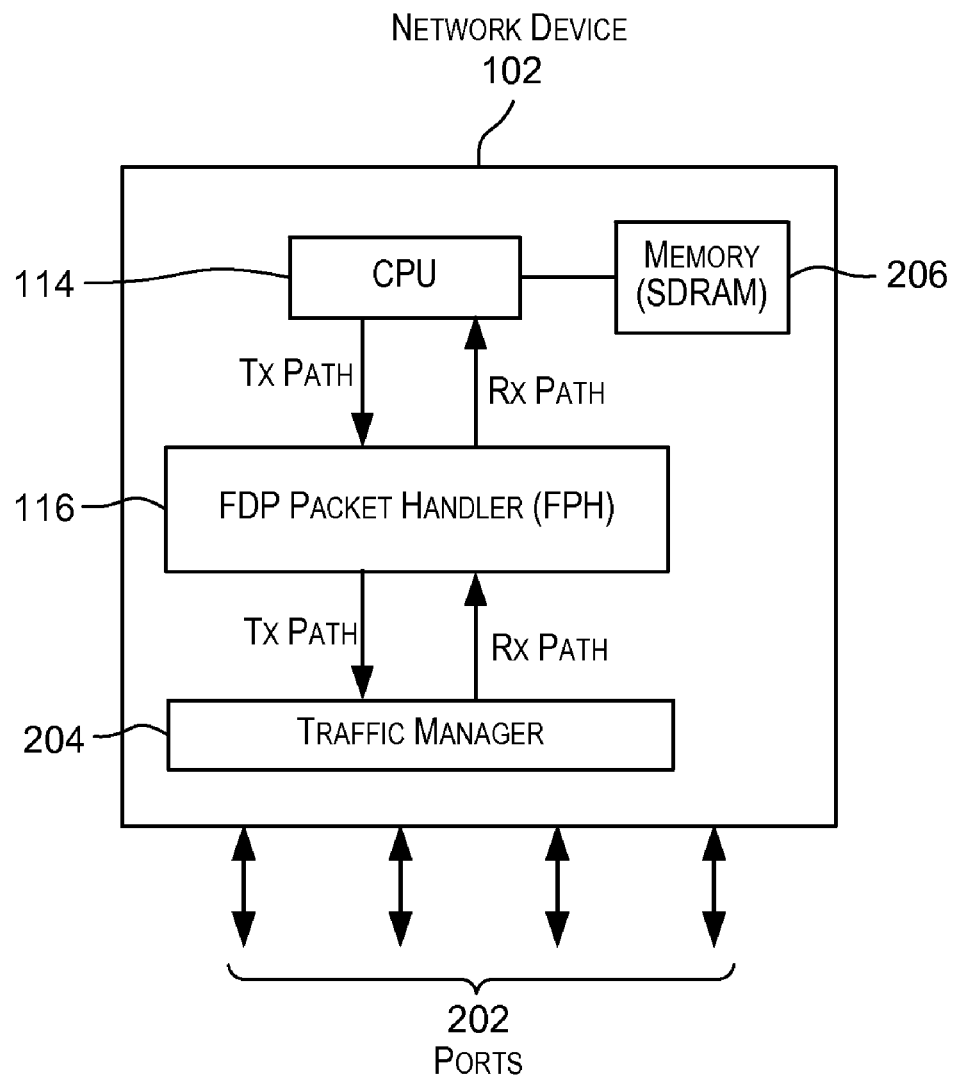
FIG. 2 depicts a simplified block diagram of a network device incorporating an embodiment of the present invention.

FIG. 2 depicts a simplified block diagram of a network device 102 incorporating an embodiment of the present invention. FIG. 2 is merely illustrative of an embodiment incorporating the present invention and does not limit the scope of the invention as recited in the claims. One of ordinary skill in the art would recognize other variations, modifications, and alternatives. Network device 102 may be embodied as a switch or router, such as routers and switches provided by Foundry Networks®, Inc. of Santa Clara, Calif.

As depicted in FIG. 2, network device 102 comprises one or more ports 202, a traffic manager (TM) module 204, an FDP packet handler (FPH) module 116, and a CPU 114 with associated memory 206 (e.g., SDRAM). Network device 102 receives data, including FDP packets, via one or more ports 202. Network device 102 may receive multiple streams of FDP packets concurrently from one or more sources for one or more FDP sessions. An FDP packet received from a source may comprise an FDP session identifier identifying the FDP session for which the packet is received. Ports 202 are also used to transmit data, including FDP packets, from network device 102.

Network device 102 may support two data processing paths including a receive path (Rx path) and a transmit path (Tx path). Processing for the two paths may be performed in parallel. The Rx path is a path traversed by a packet from a port of network device 102 towards CPU 114 of network device 102. The Tx path is a path traversed by a packet from CPU 114 towards a port of network device 102.

In one embodiment, in the Rx path, packets received by network device 102 via one or more ports 202 (or a subset of the received packets) are forwarded to TM module 204. These packets may include CPU-bound packets (i.e., packets to be forwarded to CPU 114 for processing) and other packets. TM module 204 is configured to forward the CPU-bound packets to FPH module 116. The CPU-bound packets may include FDP packets, packets that enable CPU 114 to learn network topologies, and other types of packets. In the Tx path, TM module 204 is configured to receive packets, including FDP packets, from FPH module 116. The packets are then forwarded to their destinations, which may include one or more ports 202 of network device 102. The packets, including FDP packets, are then transmitted from network device 102 using the destination ports.

FPH module 116 is configured to assist with processing related to FDP packets. In one embodiment, FPH module 116 is implemented in hardware. For example, FPH module 116 may be implemented as a field programmable logic device (FPLD) such as a programmed field-programmable gate array (FPGA) device. FPH module 116 may also be implemented as an ASIC. As depicted in FIG. 2, FPH module 116 is positioned in the Rx path between TM module 204 and CPU 114 and in the Tx path between CPU 114 and TM module 204. This enables FPH module 116 to receive all CPU-bound packets in the Rx path, including all FDP packets received by network device 102, prior to the packets being forwarded to CPU 114.

Processing of Incoming FDP Packets

In the Rx path, FPH module 116 receives CPU-bound packets from TM Interface module 204. From the packets received from TM module 204, FPH module 116 is configured to identify FDP packets. FPH module 116 may use different techniques to identify FDP packets. For example, in one embodiment, contents of a packet, including the header and/or the payload of the packet, may be examined to determine if the packet is an FDP packet. For example, a BSD packet comprises a UDP header specifying a destination port that identifies the packet as a BSD packet and accordingly an FDP packet. For an 802.1 ag packet, fields in the packet are used to identify if the packet is an 802.1 ag packet.

For a packet identified as an FDP packet, FPH module 116 determines if the FDP packet needs to be forwarded to CPU 114 or whether the FDP packet can be dropped without forwarding to CPU 114. Various different techniques may be used by FPH module 116 to determine if a packet needs to be forwarded to CPU 114. The techniques may be different for different FDPs. According to one technique, a portion of the FDP packet is compared with preconfigured reference information and the results of the comparison are used to determine if the FDP packet needs to be sent to CPU 114 or if the packet can be dropped without sending it to CPU 114. As part of the comparison, FPH module 116 is configured to determine if a portion of an FDP packet received for a session matches a corresponding entry in the reference information for that session. In one embodiment, a match indicates that the FDP packet need not be forwarded to the CPU. In such a case, the FDP packet for that session is dropped and not forwarded to CPU 114. As a result, CPU 114 does not receive the FDP packet and consequently does not have to process the dropped packet. In one embodiment, if the portion of the FDP packet being compared does not match information in the reference information, then FPH module 116 forwards the FDP packet to CPU 114. In such a scenario, FPH module 116 may also raise an interrupt signaling to CPU 114 that a packet is being forwarded to CPU 114.

Different techniques may be used to forward an FDP packet from FPH module 116 to CPU 114. In one embodiment, a direct memory access (DMA) technique may be used to forward the packet to CPU 114. FPH module 116 may DMA the packet to a buffer stored in memory 206 associated with CPU 114. CPU 114 may then read the packet from memory 206. Various other techniques may also be used to forward FDP packets to CPU 114.

The reference information that is used by FPH module 116 to determine whether or not an FDP packet for a session needs to be forwarded to CPU 114 may be preconfigured and programmed by software executed by CPU 114. The reference information may comprise various rules configured by the software for various types of FDP sessions. The reference information may be stored in different formats. In one embodiment, the reference information is stored as a table with each row entry in the table corresponding to an FDP session. In one embodiment, the reference information is stored by FPH module 116. The reference information may also be stored in other memory locations accessible to FPH module 116. For example, in one embodiment, the reference information may be stored in one or more memories 206 associated with CPU 114.

Figure 3:
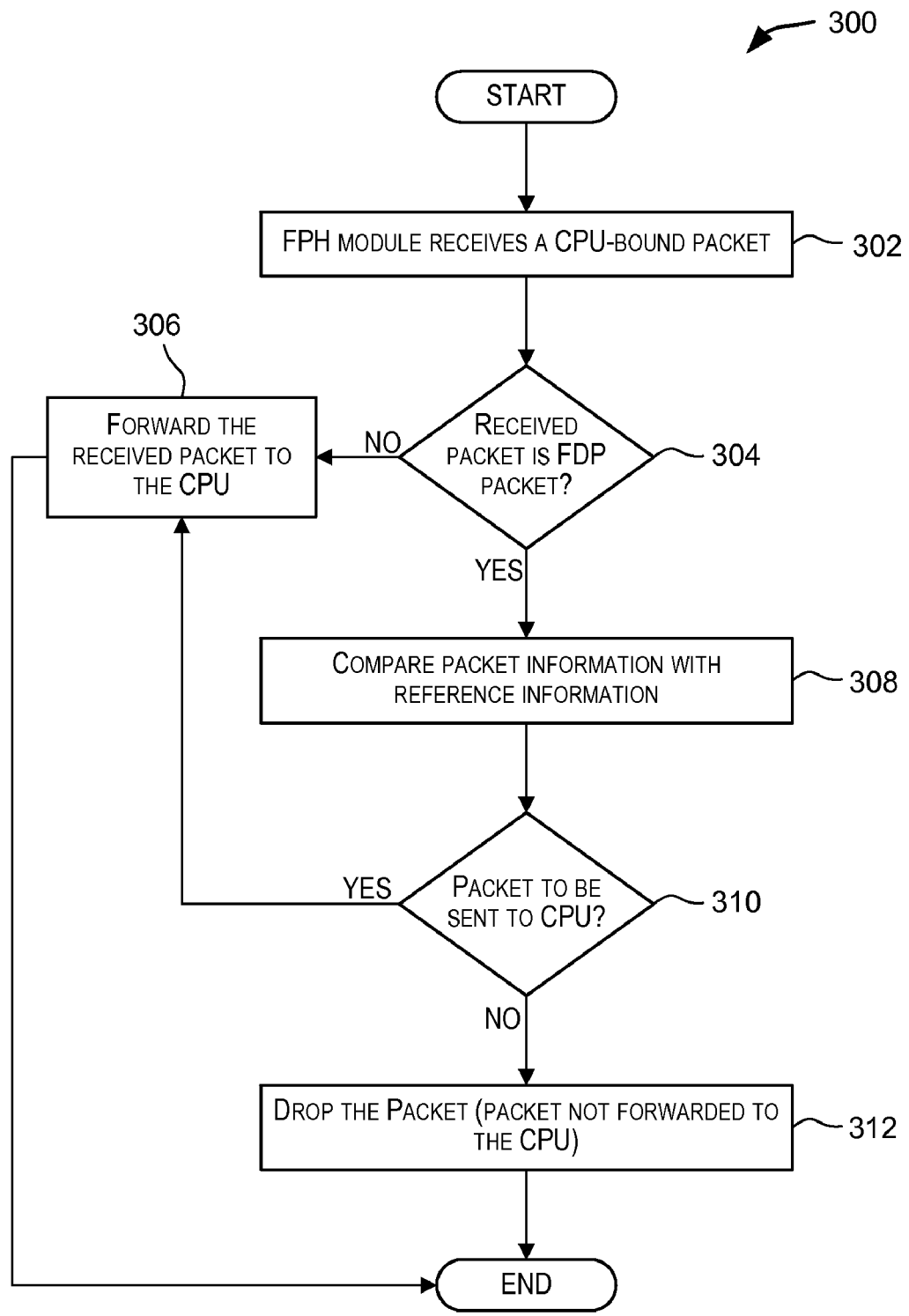
FIG. 3 depicts a simplified flowchart showing a method performed by an FDP Packet Handler (FPH) module for processing a CPU-bound packet in the receive (Rx) path according to an embodiment of the present invention.

FIG. 3 depicts a simplified flowchart 300 showing a method performed by FPH module 116 for processing a CPU-bound packet in the receive (Rx) path according to an embodiment of the present invention. As depicted in FIG. 3, processing is initiated when FPH module 116 receives a CPU-bound packet (step 302). For the embodiment depicted in FIG. 2, processing may be initiated when a CPU-bound packet is received by FPH module 116 from TM module 204.

FPH module 116 then determines if the packet is an FDP packet (step 304). As previously described, various different techniques may be used to determine if a packet is an FDP packet. For example, information stored in the header and/or payload of the packet may be used to determine if the packet is an FDP packet. As part of 304, FPH module 116 may also determine a particular FDP (e.g., BFD or 802.1 ag, or other) to which the packet belongs. If it is determined in 304 that the packet is not an FDP packet, then the packet is forwarded to CPU 114 (step 306) and processing ends. Various different techniques such as DMA techniques and others may be used to forward the packet to CPU 114.

If it is determined in 304 that the packet is an FDP packet, then a portion of the packet is compared with information stored in reference information (step 308). The reference information may be stored by FPH module 116 or may be stored in some memory location accessible to FPH module 116. The portion of the packet being compared may include a portion of the header of the packet and/or a portion of the payload of the packet. In one embodiment, the packet information is compared with reference information configured for the FDP session for which the packet is received.

Different types of reference information may be stored and used for the comparison for different FDPs. Accordingly, in 308, the reference information that is used for the comparison may depend on the FDP corresponding to the FDP packet. For example, the reference information used for a BFD packet is different from the reference information used for an 802.1 ag packet.

Based upon the results of the comparison performed in 308, a determination is made if the packet is to be forwarded to CPU 114 (step 310). In one embodiment, if the portion of the FDP packet being compared matches information in the reference information for that FDP then this indicates that the packet is not to be forwarded to CPU 114. If however the portion of the packet being compared does not match information in the reference information then the packet is identified to be forwarded to CPU 114. If it is determined in 310 that the packet is to be forwarded to CPU, then the FDP packet is forwarded to CPU 114 according to step 306 and processing terminates. If it is determined in 310 that the packet is not to be forwarded to CPU, then the FDP packet is dropped and not forwarded to CPU 114 (step 312) and processing terminates.

The processing depicted in FIG. 3 and described above may be repeated for each packet received by FPH module 116. As a result of the processing depicted in FIG. 3 and described above, only a subset of CPU-bound FDP packets received by FPH module 116 may need to be forwarded to CPU 114 for processing. In this manner, CPU 114 may not receive each FDP packet received by network device 102, thereby reducing the number of incoming FDP packets that need to be processed by CPU 114.

Determining Non-Receipt of FDP Packets

FPH module 116 is also configured to monitor non-receipt of FDP packets. FPH module 116 is configured to monitor and take appropriate actions in situations where an FDP packet for an FDP session is not received by network device 102 within a periodic time interval for that FDP session. As previously described, an FDP specifies a periodic time interval in which packets for that FDP are to be transmitted and received. When an FDP packet is not received within the expected time interval, FPH module 116 is configured to signal such an occurrence to CPU 114 since it may indicate a network failure.

As previously described, a network device such as network device 102 depicted in FIG. 2 may be involved in one or more FDP sessions. Each FDP session may have its own associated periodic time interval within which FDP packets should be received for that session. FPH module 116 is configured to monitor and track the receipt of FDP packets for each of the sessions and raise a signal if an FDP packet is not received within the time interval for a session.

FPH module 116 may use different techniques to monitor receipt and non-receipt of FDP packets information for various FDP sessions. In one embodiment, FPH module 116 maintains a pair of timers for each session. The pair of timers includes a first timer (interval_limit timer) that indicates a time interval limit within which an FDP packet should be received for that session. This timer is typically programmed by software executed by the CPU of the network device. The pair of timers also includes a second timer (last_received timer) that is used by FPH module 116 to monitor the time that it has waited to receive an FDP packet for the session since the last receipt of an FDP packet for that session. When an FDP packet for that session is received, the last_received timer is reset by FPH module 116. FPH module 116 iteratively checks the values of the interval_limit timer and the last_received timer for each of the FDP sessions in which the network device participates. During each iteration for a session, FPH module 116 checks if the last_received timer for a session has reached the interval_limit timer for that session. When the last_received timer reaches or exceeds the interval_limit timer, it indicates that the FDP packet for the session was not received in the expected time interval and FPH module 116 signals this to CPU 114. The FDP session may be considered to have expired due to the non-receipt of an FDP packet. In one embodiment, an interrupt is generated by FPH module 116 to flag that the particular FDP session has expired possibly due to some failure in the network (e.g., a link is down). If the last_received timer has not reached the interval_limit timer, then the last_received timer is incremented. In this manner, the timers are used to monitor receipt and non-receipt of FDP packets for each FDP session. The timers information may be stored by FPH module 116 or in some memory location accessible to FPH module 116.

Figure 4:
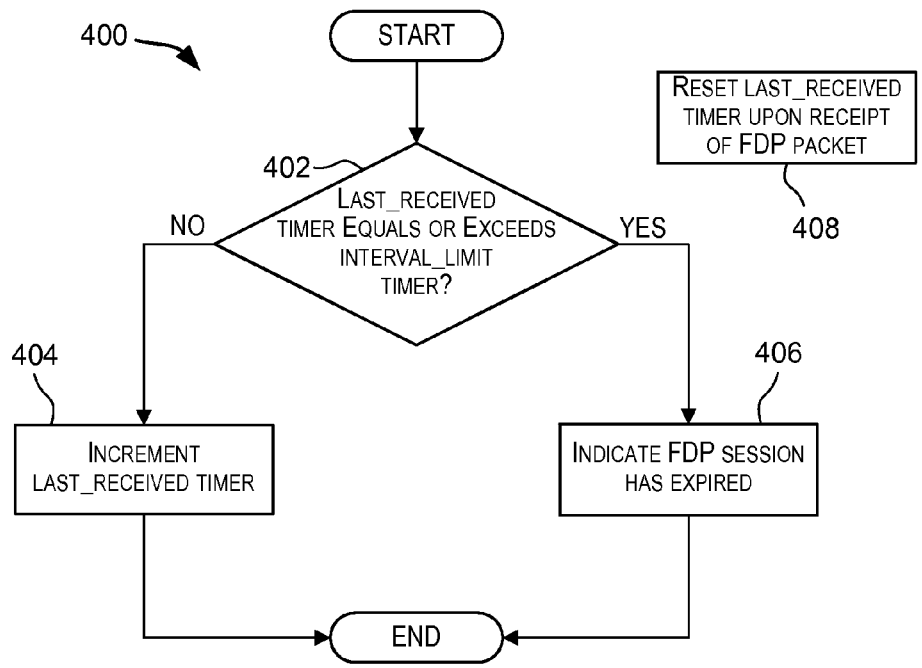
FIG. 4 depicts a simplified flowchart showing a method performed by an FPH module for detecting non-receipt of FDP packets for a session according to an embodiment of the present invention.

FIG. 4 depicts a simplified flowchart 400 showing a method performed by FPH module 116 for detecting non-receipt of FDP packets for an FDP session according to an embodiment of the present invention. FIG. 4 depicts processing performed at each iteration by FPH module 116. As depicted in FIG. 4, at each iteration, FPH module 116 checks if the last_received timer equals or exceeds the interval_limit timer (step 402). If it is determined in 402, that the last_received timer has not reached the interval_limit timer (i.e., the last_received timer is less than the interval_limit timer), the last_received timer is incremented (step 404). The amount by which the last_received timer is incremented depends upon the time frequency at which FPH module 116 performs the iterations. For example, if FPH module 116 checks the timers for a session every 1 msec, then the last_received timer is incremented by 1 msec, if the check is performed every 50 msecs then the last_received timer is incremented by 50 msecs, and so on. If it is determined in 402, that the last_received timer has reached or exceeded the interval_limit timer (i.e., the last_received timer is equal to or greater than the interval_limit timer) then this indicates that an FDP packet for the session has not been received within the time interval window for that particular FDP session and a signal is raised to indicate that the FDP session has expired (step 406). As also shown in FIG. 4, the last_received timer for an FDP session is reset to zero upon receipt of an FDP packet for that session within the interval_limit timer period (step 408).

The processing depicted in FIG. 4 is repeated by FPH module 116 for each of the FDP sessions at periodic intervals such as every one millisecond, every 50 milliseconds, etc. In one embodiment, the frequency at which the timers information is checked for a session is programmable. As previously indicated, FPH module 116 may monitor timers for multiple FDP sessions. The frequency with which FPH module 116 checks the timers information for the sessions may also be automatically determined based upon the interval_limit timers for the various sessions. For example, in one embodiment, the iteration frequency may be set to the least common denominator of the various interval_limit timers being tracked for the various sessions by FPH module 116. For example, if three FDP sessions are being tracked having interval_limit timers of 4 msecs, 6 msecs, and 12 msecs, then the frequency at which the iterations are performed may be set to 2 msecs, which is the least common denominator for the three interval_limit timers. In this manner, the frequency is programmable and/or may be automatically determined from the interval_limit timers.

As described above, in the Rx path, FPH module 116 handles processing of FDP packets received by a network device and also non-receipt of FDP packets. In the Tx path, FPH module 116 may receive packets from CPU 114 and forward the packets to TM module 204. TM module 204 may then forward the packets to the appropriate destinations for the packets.

Transmission of FDP Packets

FPH module 116 is also configured to assist in transmission of FDP packets for the various FDP sessions in which network device 102 participates. In this manner, the FDP packets transmission task is offloaded from CPU 114. In order to facilitate transmission of FDP packets, in one embodiment, FPH module 116 maintains a pair of timers for each FDP session. The pair of timers includes a first timer (trx_interval timer) that indicates the periodic transmission interval for transmitting an FDP packet for that FDP session. The trx_interval timer may be different for the different FDP sessions handled by the network device. This timer is typically programmed by software executed by CPU 114. The pair of timers also includes a second timer (last_sent timer) that is used by FPH module 116 to monitor the time when an FDP packet was last transmitted by network device 102 for the FDP session. The two timers for each session are iteratively checked at periodic intervals to determine when to transmit an FDP packet for that session. In one embodiment, when the last_sent timer is equal to the trx_interval timer, FPH module 116 transmits an FDP packet for that session and the last_sent timer is reset to zero to restart the count. The FDP packet transmitted by FPH module 116 for a session is forwarded to TM module 204 and then to a destination port of network device 102. The FDP packet is then forwarded from network device 102 using the destination port. In this manner, FPH module 116 facilitates transmission of FDP packets from network device 102 for the various FDP sessions at periodic intervals associated with the FDP sessions.

Figure 5:
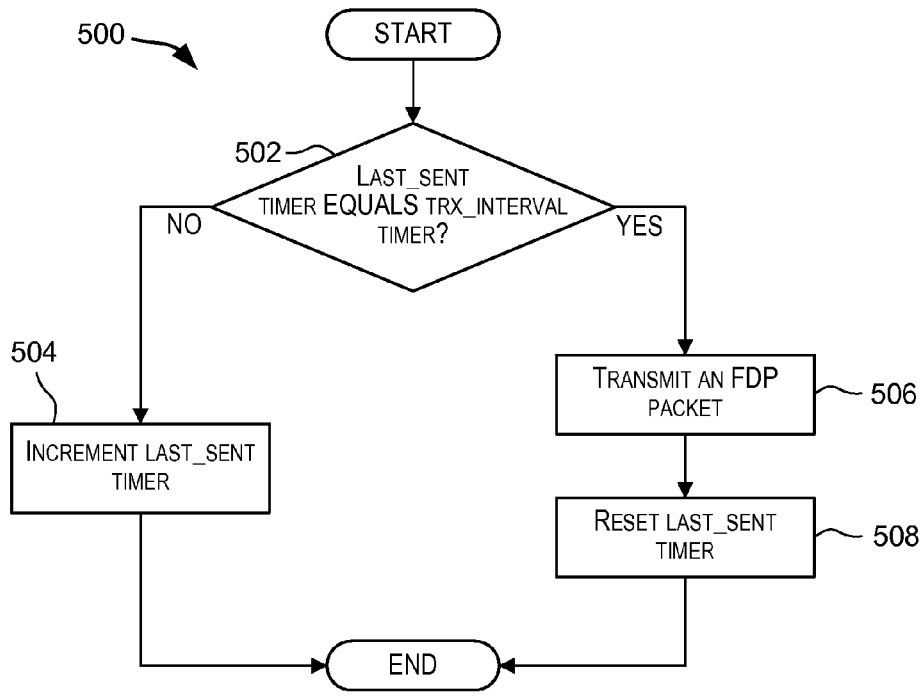
FIG. 5 depicts a simplified flowchart showing a method performed by an FPH module for transmitting FDP packets for an FDP session from a network device according to an embodiment of the present invention.

FIG. 5 depicts a simplified flowchart 500 showing a method performed by FPH module 116 for transmitting FDP packets for an FDP session from network device 102 according to an embodiment of the present invention. FIG. 5 depicts processing performed at each iteration by FPH module 116. As depicted in FIG. 5, at each iteration, FPH module 116 checks if the last_sent timer has reached the trx_interval timer (step 502). If it is determined in 502, that the last_sent timer has not reached the trx_interval timer (i.e., the last_sent timer is less than the trx_interval timer), the last_sent timer is incremented (step 504). The amount by which the last_sent timer is incremented depends upon the time frequency at which FPH module 116 checks the timers for the session. For example, if FPH module 116 checks the timers for a session very 1 msec, then the last_received timer is incremented by 1 msec, if the iteration is performed every 50 msecs then the last_received timer is incremented by 50 msecs, and so on. If it is determined in 502 that the last_sent timer has reached the trx_interval timer (i.e., the last_sent timer is equal to the trx_interval timer), this indicates that it is time to transmit an FDP packet for the session and an FDP packet is transmitted (step 506). In one embodiment, as part of 506, FPH module 116 transmits an FDP packet for the session to TM module 204. The FDP packet is then forwarded to a port of the network device and transmitted from the network device via the port. After an FDP packet transmission, the last_sent timer is reset to zero to restart the countdown for the next time an FDP packet is to be sent for the session (step 508). The processing depicted in FIG. 5 is repeated at each iteration.

The processing depicted in FIG. 5 and described above may be performed by FPH module 116 at periodic intervals for each FDP session of network device 102. The frequency at which the processing is performed may be every one millisecond, every 50 milliseconds, etc. In one embodiment, the frequency at which FPH module 116 performs the processing depicted in FIG. 5 is programmable. The frequency may also be automatically determined based upon the trx_interval timers for the various sessions. For example, the processing frequency may be set to the least common denominator of the various trx_interval timers for the various FDP sessions of network device 102. For example, if three FDP sessions are being handled having trx_interval timers of 20 msecs, 40 msecs, and 100 msecs, then the frequency at which the iterations are performed may be set to 20 msecs. In this manner, the frequency is programmable and/or may be automatically determined from the trx_interval timers.

As depicted in FIG. 5 and described above, FPH module 116 handles transmission of FDP packets at regular intervals for the various FDP sessions of network device 102. The sessions may correspond to different FDPs. Software executed by CPU 114 typically pre-configures the periodic intervals at which FDP packets are to be sent for the FDP sessions and FPH module 116 handles the transmission of FDP packets for the sessions. The periodic time interval for a session at which FDP packets are transmitted for that session may be measured in seconds (e.g., every 1 second, every 5 seconds, etc.) or even faster than one second such as measured in milliseconds (e.g., every 1 msec, every 5 msecs, etc.), or some other faster or slower time period. In this manner, the FDP packets transmission task is offloaded from CPU 113 by FPH module 116.

Figure 6:
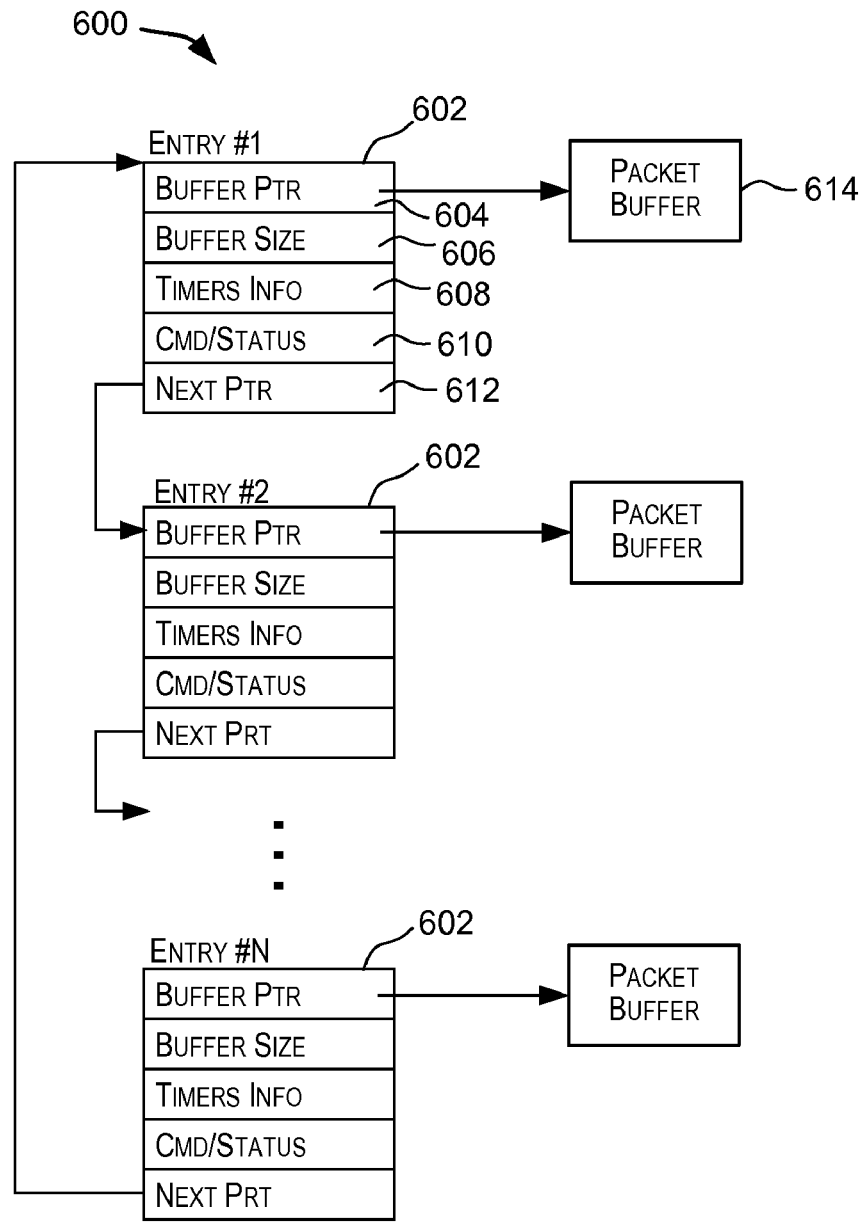
FIG. 6 depicts an example of a linked list priority queue that may be used by an FPH module to facilitate transmission of FDP packets according to an embodiment of the present invention.

Various different memory structures may be used to facilitate automated transmission of FDP packets. In one embodiment, CPU 114 may provide multiple priority queues for transmitting packets. Each priority queue is implemented as a linked list that contains a set of descriptor entries. In one embodiment, one or more such linked list priority queues are assigned to FPH module 116 to facilitate transmission of FDP packets. FIG. 6 depicts an example of a linked list priority queue 600 that may be used by FPH module 116 to facilitate transmission of FDP packets according to an embodiment of the present invention. As depicted in FIG. 6, linked list 600 comprises a set of descriptor entries 602. Each entry 602 corresponds to and stores information for an FDP session for which an FDP packet is to be transmitted. Each entry 602 comprises: (1) a buffer pointer 604 pointing to a memory location 614 storing the corresponding FDP packet; (2) buffer size information 606 identifying the size of the corresponding FDP packet; (3) timers information 608; (4) command/status information 610; and (5) a pointer 612 pointing to the next entry in the linked list. Pointer 612 is used to traverse the entries in linked list 600. In one embodiment, linked list 600 may be implemented as a circular linked list wherein pointer 612 of the last entry in the linked list points to the first entry in the linked list. For a session, FPH module 116 uses the information stored in the entry 602 for the session to transmit FDP packets for that session in an automated manner that does not require CPU processing.

Timers information 608 in an entry stores the trx_interval timer and the last_sent timer values for the FDP session corresponding to the entry. The trx_interval timer value for the session is initialized by software executed by CPU 114. As previously described, the trx_interval and last_sent timers are used by FPH module 116 to determine when to send an FDP packet for the session.

According to an embodiment of the present invention, a base timer may be associated with linked list 600 used by FPH module 116 to transmit FDP packets. The base timer for a linked list determines the interval at which the entries in the linked list are visited and checked by FPH module 116. For example, if the base timer for linked list 600 depicted in FIG. 6 is 5 msecs, then FPH module 116 visits each entry in the linked list every 5 msecs. FPH module 116 may start with one entry in the linked list and then use next pointer 612 to traverse through the various entries in the linked list. For a linked list with an associated base timer, the trx_interval and last_sent timer values stored for each entry in the linked list may be expressed as multiples of the base timer value. For example, if the base timer value associated with linked list 600 is 5 msecs, then the trx_interval and last_sent timer values in entries 602 may be expressed as a multiple of the base timer 5 msecs. For example, if the periodic time interval for transmitting an FDP packet for a session is 20 msecs, then trx_interval for that session may be expressed as (4 * base timer). In one embodiment, the base timer for a linked list is determined based upon the trx_interval timers for the various session entries in the linked list as the least common denominator of the trx_interval timer values.

Command/status information 610 may store other information related to the FDP session. For example, if the FDP session requires any special processing then that information may be stored in information 610.

Various other types of data structures may also be used to facilitate FDP packets transmission in alternative embodiments. For example, in one embodiment multiple linked lists may be used by FPH module 116 to facilitate transmission of FDP packets, each with its own associated base timer. In one embodiment using two linked lists, one linked list may have an associated base timer of 1 msec and the other may have an associated base timer of 50 msecs. A session may be allocated to one of the two linked lists based upon the trx_interval timer values associated with the session. For example, an FDP session having a trx_interval timer of 100 msecs may be allocated to the linked list having an associated base timer of 50 msecs whereas an FDP session having a trx_interval timer of 6 msecs may be allocated to the linked list having an associated base timer of 1 msec. In one embodiment, FPH module 116 may also be configured to transmit FDP packets for all the FDP session entries in a liked list at once (referred to as a "one-shot" transmission).

New entries may be added to a transmission linked list as more FDP sessions are initiated. In one embodiment, when a new entry is to be added to a linked list, the transmit functionality is disabled for the linked list to which the entry is to be added. In one embodiment, a one-shot transmission may be first performed for the linked list prior to the disabling. The new entry is then added to the linked list. The transmit operations for the linked list, now with the new entry for a new session, are then enabled. The trx_interval timer information for a session entry in the linked list may also be changed by software executed by the CPU of a network device.

As described above, FPH module 116 offloads some of the FDP packets-related processing that was conventionally performed by software executed by a CPU of a network device. In the Rx path, FPH module 116 determines if an FDP packet received by network device 102 needs to be provided to CPU 114 for processing. If it is determined that the FDP packet does not need to be forwarded to CPU 114 then the FDP packet is dropped. If instead, it is determined that the FDP packet needs to be forwarded to CPU 114 then FPH module 116 forwards the packet to CPU 114.

Processing Using Dual Ring Structures

Figure 7:
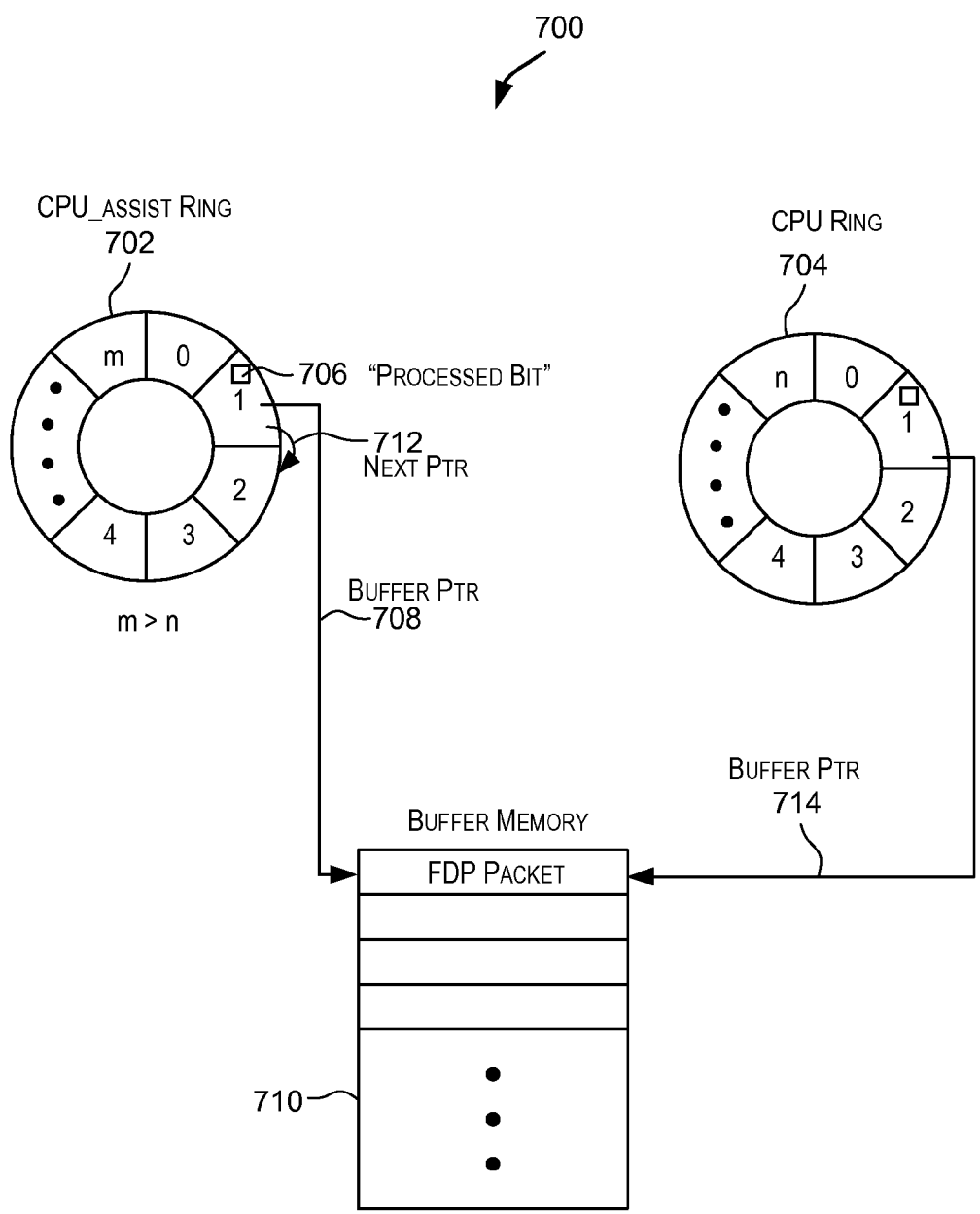
FIG. 7 depicts a two ring structure that may be used by an FPH module to facilitate processing of FDP packets in the receive (Rx) path according to an embodiment of the present invention.

Various data structures may be used by FPH module 116 to facilitate processing of FDP packets in the Rx path. According to an embodiment of the present invention, a dual ring structure is used to facilitate the processing. A dual ring structure may comprise two rings, with each ring being a circular linked list of entries. FIG. 7 depicts a two ring structure 700 that may be used by FPH module 116 to facilitate processing of FDP packets in the receive (Rx) path according to an embodiment of the present invention. As depicted in FIG. 7, structure 700 comprises a first ring 702 (referred to as a CPU_assist ring) and a second ring 704 (referred to as the CPU ring). CPU_assist ring 702 comprises a number of entries storing information related to FDP packets received by FPH module 116. The processing of CPU_assist ring 702 is handled by FPH module 116. CPU ring 704 comprises several entries storing information for FDP packets (and possibly for other packets) that are to be processed by CPU 114. CPU 114 handles the processing of CPU ring 704.

The number of entries in the two rings may be user-configurable. The entries are sometimes referred to as descriptor entries as they store information describing FDP packets. The number of entries in CPU_assist ring 702 is generally greater than the number of entries in CPU ring 704.

CPU_assist ring 702 is used by FPH module 116 to process FDP packets received by the network device and by FPH module 116 in the Rx path. CPU_assist ring 702 comprises a number of entries ("m" entries depicted in FIG. 7) for storing information used for processing FDP packets. As depicted in FIG. 7, CPU_assist ring 702 may be implemented as a circular linked list of entries storing information related to FDP packets. The FDP packets themselves may be buffered in buffer memory 710. When an FDP packet is received by a network device, the packet is stored in buffer memory 710 that is accessible to FPH module 116 and information corresponding to the buffered FDP packet is stored in an entry of CPU_assist ring 702. FPH module 116 then manages processing of the FDP packets using the entries in CPU_assist ring 702.

Buffer memory 710 used for buffering the FDP packets may be located in FPH module 116 or in some other location accessible to FPH module 116. In embodiments where the memory resources of FPH module 116 are limited, buffer memory 710 may be stored for example in a memory (e.g., SDRAM 206) associated with CPU 114.

In one embodiment, each entry in CPU_assist ring 702 for an FDP packet buffered in memory 710 comprises the following information: (1) a buffer pointer 708 pointing to the location in buffer memory 710 storing the FDP packet corresponding to the entry; (2) a "processed bit" 706 indicating if the FDP packet corresponding to the entry has been processed by FPH module 116; and (3) a next pointer 712 pointing to the next descriptor entry in CPU_assist ring 702.

Processed bit 706 in an entry is used to identify the processing status of the FDP packet corresponding to the entry. In one embodiment, if the bit is set to 0 (zero), it indicates that the FDP packet corresponding to the entry needs to be processed. If the bit is set to 1 (one), it indicates that the FDP packet for the entry has already been processed and the entry is available for storing information for a new FDP packet. The bit is set to 1 (one) after the FDP packet has been processed.

A process_start_address pointer and a dma_start_addr pointer may also be provided (not shown in FIG. 7) and function as read and write pointers for CPU_assist ring 702 respectively. The dma_start_addr points to the entry in ring 702 that is available for storing information for an incoming FDP packet. The process_start_address points to the next entry in ring 702 that is available for storing information for an incoming FDP packet. FPH module 116 uses these pointers to traverse CPU_assist ring 702 and process entries corresponding to buffered FDP packets.

FPH module 116 traverses CPU_assist ring 702 at regular time intervals to process FDP packets corresponding to entries in CPU_assist ring 702. For an unprocessed entry (as indicated by processed bit set to 0 in the entry), FPH module 116 uses the buffer pointer of the entry to access the corresponding FDP packet stored in buffer memory 710. A portion of the FDP packet is then selected and compared to information stored in reference information for the FDP. As described above, if there is a match, it indicates that the FDP packet need not be provided to CPU 114 and can be dropped. In this event, processed bit 706 of the entry in CPU_assist ring 702 is set to 1 to indicate that the FDP packet corresponding to the entry has been processed and the FDP packet is dropped.

If there is no match, it indicates that the FDP packet is to be provided to CPU 114. In this case, a buffer swap is performed between the buffer pointed to by the entry in CPU_assist ring 702 and a free entry in CPU ring 704. In one embodiment, as a result of the swap, a buffer pointer in a previously available entry in CPU ring 704 is made to point to a buffer memory location pointed to by the buffer pointer in the entry in CPU_assist ring 702. In this manner, after the buffer swap, a buffer pointer in an entry in CPU ring 704 now points to the location of the buffered FDP packet. For example, in FIG. 7, buffer pointer 714 of CPU ring 704 points to the FDP packet stored in buffer memory 710. CPU 114 may then access the FDP packet from buffer memory 710 and process the FDP packet. After the buffer swap, processed bit 706 in the entry in CPU_assist ring 702 is set to 1 to indicate that the entry is available for storing information for a new FDP packet and the buffer pointer for the entry is freed.

There may be situations where there are no available entries in CPU ring 704 for performing the buffer swap. This may occur for example when CPU 114 is backed up in its processing and is unable to process the FDP packets pointed to by entries in CPU ring 704 in a timely manner. This scenario may arise due to the rate at which FDP packets are received by the network device exceeding the rate at which CPU 114 is able to process the FDP packets. In such a scenario, FPH module 116 drops the buffered FDP packet corresponding to the entry in CPU_assist ring 702 whose pointer is to be swapped. FPH module 116 then continues processing of the next entry in CPU_assist ring 702 corresponding to the next unprocessed FDP packet. In this manner, FPH module 116 is able to continue processing the incoming FDP packets even if CPU 114 is backed up. This minimizes the number of incoming FDP packets that are dropped due to CPU 114 being busy.

The dual ring structure depicted in FIG. 7 and described above decouples receipt of FDP packets by network device 102 from processing of FDP packets by CPU 114 of the network device. FDP packets received by a network device are buffered in buffer memory 710 and corresponding entries stored in CPU_assist ring 702 which is handled by FPH module 116. Buffering of FDP packets and processing of the packets by FPH module 116 is done separately from the processing of FDP packets performed by CPU 114 using CPU ring 704. In this manner, CPU 114 may continue to process FDP packets (or perform other functions) using CPU ring 704 while FDP packets are being received and buffered by the network device. The decoupling enables FDP packets to be received without being concerned about the status of CPU 114. Accordingly, FDP packets may be received by a network device at a rate that is faster than the rate at which the CPU of the network device can process the FDP packets. Even if CPU 114 is backed up processing FDP packets or performing other tasks, FDP packets may continue to be received and processed by FPH module 116 using CPU_assist ring 702. As a result, incoming FDP packets do not have to be dropped due to CPU 114 being tied up with other processing activities (including processing of previously received FDP packets). This is particularly useful given the bursty nature of FDP packets. The decoupling also enables CPU 114 to process FDP packets without being hindered by the frequency at which the FDP packets are received by the network device. Further, only those FDP packets that need to be sent to CPU 114 are sent to CPU ring 704 from CPU_assist ring 702. In this manner, CPU 114 does not see or process FDP packets that do not need to be sent to CPU 114.

Figure 8:
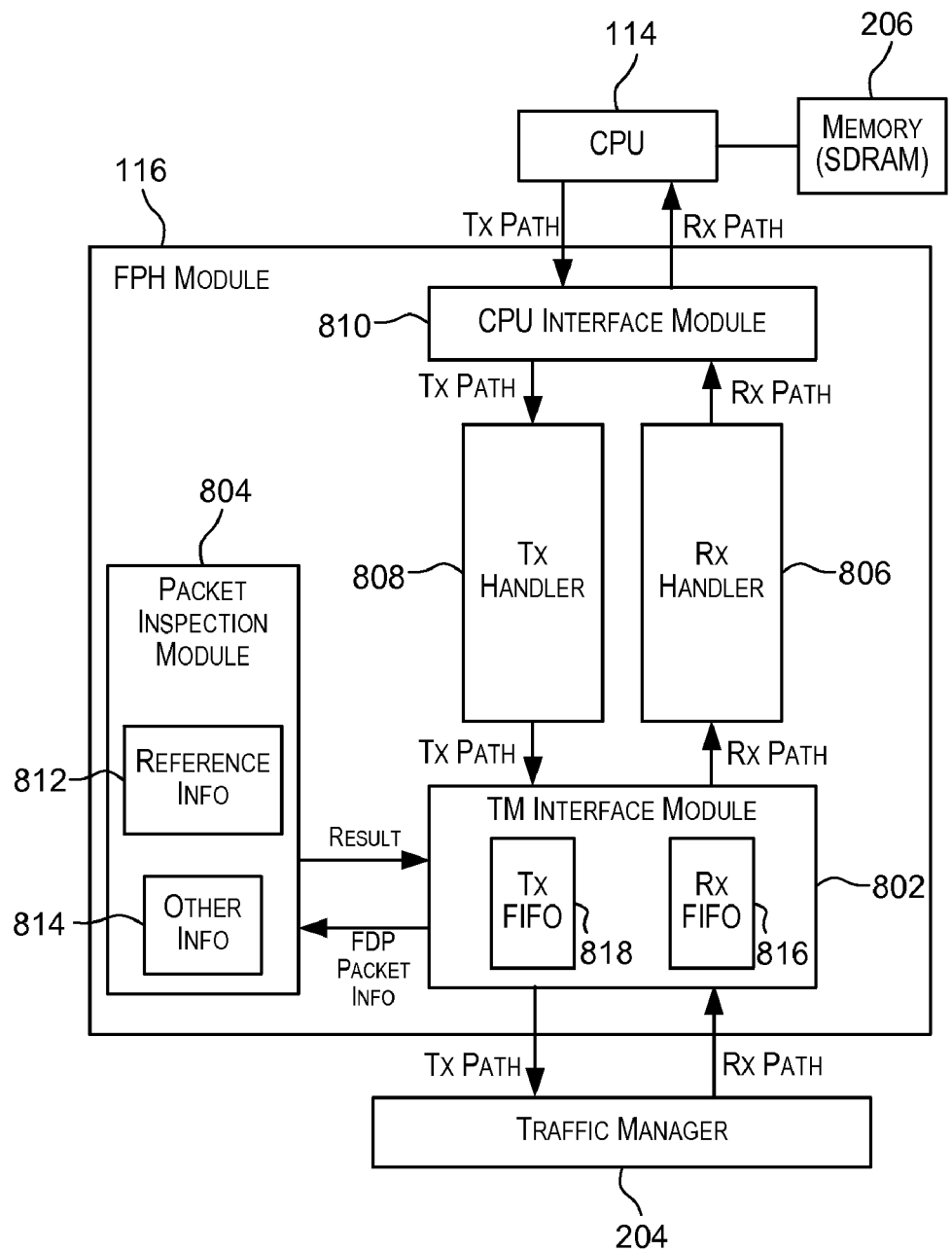
FIG. 8 is simplified block diagram of an FPH module according to an embodiment of the present invention.

FIG. 8 is simplified block diagram of a FPH module 116 according to an embodiment of the present invention. FPH module 116 includes a number of modules including a TM Interface module 802, a Packet Inspection module 804, a Receive (Rx) Handler module 806, a Transmit (Tx) Handler module 808, and a CPU interface module 810. FIG. 8 is merely illustrative of an embodiment incorporating the present invention and does not limit the scope of the invention as recited in the claims. One of ordinary skill in the art would recognize other variations, modifications, and alternatives. FPH module 116 may be incorporated in a network device such as a switch or router, such as routers and switches provided by Foundry Networks®, Inc. of Santa Clara, Calif.

TM Interface module 802 provides an interface for receiving packets from and transmitting packet to TM module 204. In the Rx path, TM Interface module 802 receives CPU-bound packets, including FDP packets, from TM module 204. The incoming packets may be buffered in Rx FIFO 816 for analysis. TM Interface module 802 identifies FDP packets from the CPU-bound packets received from TM module 204. Packets that are not FDP packets are forwarded to Rx handler module 806 for forwarding to CPU 114. For a packet identified as an FDP packet, TM Interface module 802 presents a portion of the FDP packet to Packet Inspection module 804 for analysis. In one embodiment, this is done by presenting an offset into the FDP packet to Packet Inspection module 804. The offset is programmable and may be different for different FDPs. The portion of the FDP packet presented to Packet Inspection module 804 may include a portion of the header of the FDP packet, a portion of the payload of the FDP packet, or even the entire FDP packet. The portion of the FDP packet generally includes the session identifier for the packet.

Packet Inspection module 804 is configured to take the portion of the FDP packet received from TM Interface module 802 and compare information in the portion with reference information that has been programmed by software running on CPU 114. The reference information may be stored by Packet Inspection module 804 (e.g., reference information 812 depicted in FIG. 8) or alternatively may be stored in a memory location accessible to Packet Inspection module 804. In one embodiment, the reference information may store one or more session entries for different FDP sessions.

Packet Inspection module 804 may use an indexing scheme to perform the compare operation. In one embodiment, a part of the portion of the FDP packet received from TM Interface module 802 is used as an index into the reference information to identify an entry in the reference information corresponding to a particular session. The size of the index may vary based upon the number of session entries in the reference information. For example, a 9-bit index is needed for indexing 512 reference information entries. The information stored in a particular session entry identified using the index is then compared to the information in the portion of the FDP packet received from TM Interface module 802 to determine if there is a match. Results of the match are provided to TM Interface module 802. The results identify whether or not the information in the portion of the FDP packet matched the information in the particular session entry indexed by the FDP packet portion.

As described above, TM Interface module 802 receives a result response from Packet Inspection module 804 indicating whether or not the FDP packet information matched the corresponding information in the reference information. If the received result indicates a match, then this indicates to TM Interface module 802 that the particular FDP packet can be dropped and need not be forwarded to CPU 114. TM Interface module 802 then drops the FDP packet and flushes Rx FIFO 816 buffers corresponding to the FDP packet. The FDP packet is dropped without notifying CPU 114 about the packet. If the result received from Packet Inspection module 804 indicates that the FDP packet information did not match information in the session entry in the reference information, TM Interface module 802 forwards the FDP packet to Rx handler module 806 for forwarding to CPU 114.

TM Interface module 802 is also configured to flag an error when an FDP packet for an FDP session is not received within a periodic time interval corresponding to the FDP session. In one embodiment, for each FDP session handled by the network device, TM Interface module 802 stores information (e.g., timers information) tracking when the last FDP packet for the session was received and when the next FDP packet is due to be received. If the next FDP packet for that session is not received within the time interval for that FDP session, then an error is flagged. CPU 114 may be notified about the error.

Rx Handler 806 is configured to receive CPU_bound packets, including FDP packets, from TM Interface module 802 and provide the packets to CPU Interface module 810 for forwarding to CPU 114. Rx Handler 806 may also comprise a FIFO for storing the CPU-bound packets before being forwarded to CPU 114.

CPU Interface module 810 is configured to forward packets to CPU 114. In one embodiment, a DMA technique is used to forward packets to CPU 114. In such an embodiment, CPU Interface Module 810 acts as a DMA engine that DMAs the packets to CPU 114. In one embodiment, the packet is written to a memory 206 associated with CPU 114 from where the packet can be accessed by CPU 114. Different interfaces may be used to forward packets from FPH module 116 to CPU 114. For example, in one embodiment, a PCI bus interface may be used to forward packets to CPU 114. In such an embodiment, CPU Interface Module 810 may comprise PCI-related modules for forwarding packets to CPU 114. In one embodiment, the DMA engine is part of Rx handler 806 and CPU interface module 810 initiates the DMA process.

CPU Interface Module 810 is also configured to receive packets from CPU 114. These packets are then forwarded to Tx Handler module 808. Tx Handler module 808 may comprise a FIFO for storing the packets. The packets are then forwarded to TM Interface module 802. In one embodiment, Tx Handler module 808 comprises a DMA engine that retrieves FDP packets from the CPU SDRAM. TM Interface module 802 may comprise a Tx FIFO 818 for storing the packets prior to transmission. A descriptor entries scheme may be used for retrieving and storing the packets. TM Interface module 204 then forwards the packets to TM module 204. The packets may then be forwarded to the appropriate destination ports and transmitted from network device 102 via the destination ports.

According to an embodiment of the present invention, Tx Handler module 808 is configured to handle transmission of FDP packets from network device 102 for various FDP sessions. In one embodiment, Tx Handler module 808 maintains a pair of timers for each FDP session handled by the network device. As previously described, the pair of timers may include a trx_interval timer that indicates that transmission interval for transmitting an FDP packet for that FDP session and a last_sent timer that is used to monitor the time when an FDP packet was last transmitted by the network device for the FDP session. The two timers for each session are iteratively checked at periodic intervals to determine when to transmit an FDP packet for each session.

Tx Handler module 808 may use different structures to facilitate automated transmission of FDP packets. For example, in one embodiment, one or more circular linked lists (such as linked list 600 depicted in FIG. 6 and described above) may be provided to facilitate the transmission. Multiple linked lists may also be used, each with an associated base timer. The base timer for a linked list determines the frequency at which Tx Handler 808 visits and checks the entries in the linked list. For example, a list having an associated base timer of 1-msec is checked every 1-msec, a list having an associated base timer of 50 msecs is checked every 50 msecs, a list having an associated base timer of 200 msecs is checked every 200 msecs, and so on. In one embodiment, two linked lists are used: a first linked list having a 1 millisecond based timer and a second linked list having a 50 milliseconds base timer may be used. The entries in the 1-msec linked list are checked by Tx Handler module 808 every 1 msec. This linked list may store entries for FDP sessions whose periodic transmission intervals are multiples of 1 msec, e.g., 4 msecs, 15 msecs, etc. The 50-msec linked list entries are checked by Tx Handler module 808 every 50 msecs. This linked list may store entries for FDP sessions whose periodic transmission intervals are multiples of 50 msecs, e.g., 100 msecs, 250 msecs, etc.

The FDP packets transmitted by Tx Handler 808 are forwarded to TM Interface module 802 and then to TM module 204. The FDP packets are then forwarded to one or more ports of the network device and then transmitted from the network device using the one or more ports.

As described above, embodiments of the present invention reduce the amount of FDP packets-related processing that a CPU of a network device has to perform. For incoming FDP packets, FPH module 116 assists the CPU by reducing the number of incoming FDP packets that a CPU has to process. FPH module 116 is also able to flag when an FDP packet for an FDP session is not received within the periodic time interval for the session. FPH module 116 also handles transmission of FDP packets for various sessions at regular time intervals. The FDP packets transmission task is thus offloaded from the CPU of the network device. This further reduces the processing cycles that the CPU of the network device has to spend on FDP-packets related processing. This enables the network device to be able to support newer FDPs such as 802.1 ag and BFD having very short periodic time intervals for transmission of FDP packets (e.g., faster than 1 second, more typically in milliseconds such as 1 millisecond, 5 milliseconds, or even shorter) without adversely affecting CPU performance. Accordingly, embodiments of the present invention enable a network device to process reception and transmission of FDP packets that may be received and transmitted at a rate faster than 1 FDP packet per second. Embodiments of the present invention are able to handle FDPs having periodic time intervals that may be one or more milliseconds (msecs), one or more seconds, or other shorter or longer time intervals.

As previously indicated, there are several different types of FDPs. Examples include BFD and 802.1 ag. The following sections of the application describe embodiments of present invention for BFD and 802.1 ag packets processing.

Processing of Bidirectional Forwarding (BFD) Protocol Packets

Figures 9, 10:
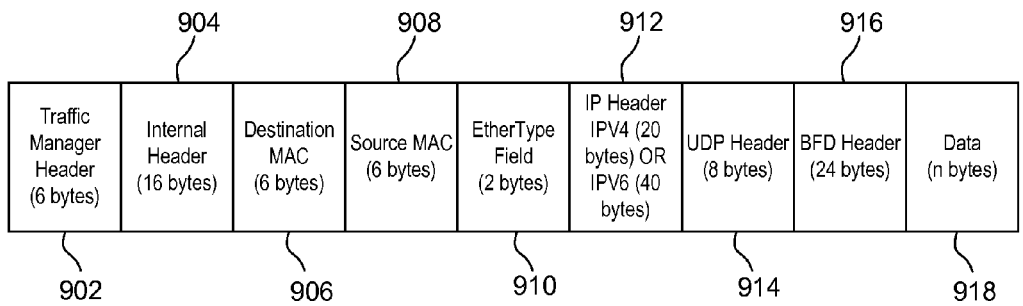
FIG. 9 depicts a format for a BFD packet.
FIG. 10 depicts the format for a BFD header field.

As previously described, BFD is a type of FDP. FIG. 9 depicts a format for a BFD packet. A BFD packet is delineated by a Start of Packet (SOP) and an End of Packet (EOP) field. A BFD packet is generally transmitted in a unicast, point-to-point mode. As depicted in FIG. 9, a BFD packet comprises a Unicast header 902, an internal header 904, a Destination MAC 906, a source MAC 908, an EtherType field 910, an IP header (IPv4 or IPv6) 912, a UDP header 914, a BFD header 916, and data 918.

EtherType Field 910 indicates whether the IP Header is IPv4 or IPv6. For example, a value of 0x0800 indicates IPv4 while 0x86DD indicates IPv6. In case of an IPv4 packet, IP header field 912 comprises 20 bytes of an IPv4 header (as specified by the IPv4 protocol). In case of an IPv6 packet, IP header field 912 comprises 40 bytes of an IPv6 header (as specified by the IPv6 protocol).

UDP header section 914 of the packet is used by FPH module 116 to identify a packet as a BFD packet. The following Table A shows the contents of UDP header section 914.

TABLE A

| Field | Size (bits) | Purpose |
|---|---|---|
| | UDP Header Format | |
| Checksum | 16 | UDP checksum. |
| Source Port | 16 | A free port on the sender's machine where any responses should be sent. |
| Destination Port | 16 | This field identifies the destination program on the server this packet should be directed to. This value is (decimal) 3784 for BFD control and |

TABLE A-continued

UDP Header Format

| Field | Size (bits) | Purpose |
|---|---|---|
| Message Length | 16 | (decimal) 3785 for BFD echo packets. Total size of UDP header plus data payload (but not the IP header) in 8-bit chunks (aka bytes or octets). |

A BFD echo packet is addressed to the router who is sending it, so that the next-hop router will send the packet back to the initiating router. FPH module 116 uses the "Destination Port" field to identify a packet as a BFD packet.

FIG. 10 depicts the format for BFD header field 916. The various fields in the BFD header field include:

(1) Version (3-bit): The version number of the protocol.

(2) Diagnostic (Diag) (5-bit): A diagnostic code specifying the local system's reason for the last session state change. This field allows remote systems to determine the reason that the previous session failed. Values are: 0—No Diagnostic; 1—Control Detection Time Expired; 2—Echo Function Failed; 3—Neighbor Signaled Session Down; 4—Forwarding Plane Reset; 5—Path Down; 6—Concatenated Path Down; 7—Administratively Down; 8—Reverse Concatenated Path Down; 9-31—Reserved for future use.

(3) State (STA) (2-bit): The current BFD session state as seen by the transmitting system. Values are: 0—AdminDown; 1—Down; 2—Init; 3—UpPoll (P) (1-bit): If set, the transmitting system is requesting verification of connectivity, or of a parameter change. If clear, the transmitting system is not requesting verification.

(4) Final (F) (1-bit): If set, the transmitting system is responding to a received BFD Control packet that had the Poll (P) bit set. If clear, the transmitting system is not responding to a Poll.

(5) Control Plane Independent (C) (1-bit): If set, the transmitting system's BFD implementation does not share fate with its control plane. If clear, the transmitting system's BFD implementation shares fate with its control plane.

(6) Authentication Present (A) (1-bit): If set, the Authentication Section is present and the session is to be authenticated.

(7) Demand (D) (1-bit): If set, the transmitting system wishes to operate in Demand Mode. If clear, the transmitting system does not wish to or is not capable of operating in Demand Mode.

(8) Reserved (R) (1-bit): This bit must be zero on transmit, and ignored on receipt. Detect Multiple (8-bit): Detect time multiplier. The negotiated transmit interval, multiplied by this value, provides the detection time for the transmitting system in Asynchronous mode.

(9) Length (8-bit): Length of the BFD Control packet, in bytes.

(10) My Discriminator (32-bit): A unique, nonzero discriminator value generated by the transmitting system, used to demultiplex multiple BFD sessions between the same pair of systems.

(11) Your Discriminator (32-bit): The discriminator received from the corresponding remote system. This field reflects back the received value of My Discriminator, or is zero if that value is unknown.

(12) Desired Min TX Interval (32-bit): This is the minimum interval (in microseconds) that the local system would like to use when transmitting BFD Control packets.

(13) Required Min RX Interval (32-bit): This is the minimum interval, in microseconds, between received BFD Control packets that this system is capable of supporting.

(14) Required Min Echo RX Interval (32-bit): This is the minimum interval, in microseconds, between received BFD Echo packets that this system is capable of supporting. If this value is zero, the transmitting system does not support the receipt of BFD Echo packets.

In the receive (Rx) path, TM Interface module 802 determines if an incoming packet is a BFD packet based upon the "Destination Port" information in the UDP header portion of the packet. TM Interface module 802 then determines if the BFD packet should be dropped (or terminated) or otherwise should be sent to CPU 114 for inspection. As part of this determination, TM Interface module 802 presents a portion of the BFD packet to Packet Inspection module 804. Generally, an offset into the BFD packet is provided to Packet Inspection module 804.

Figure 11:
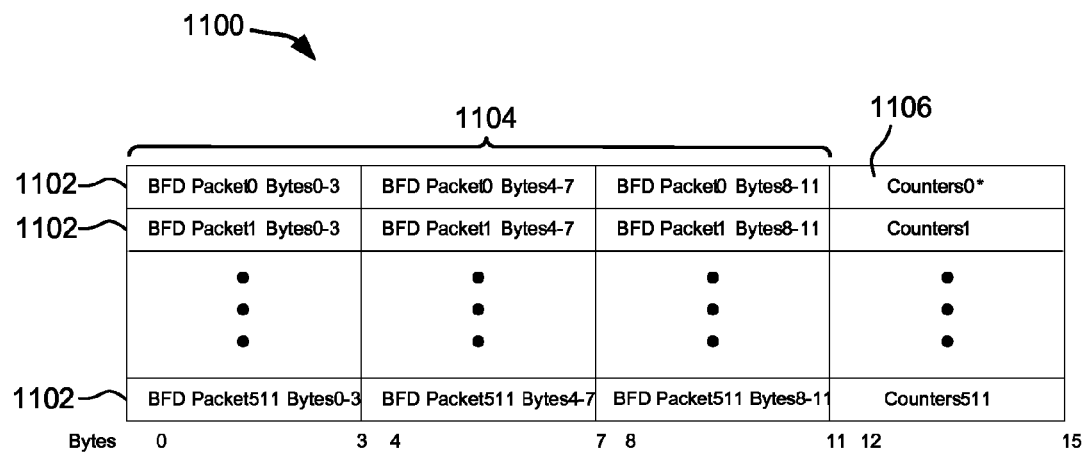
FIG. 11 depicts a memory structure storing BFD reference information for multiple BFD sessions according to an embodiment of the present invention.

Packet Inspection module 804 then compares the information in the BFD packet portion received from TM Interface module 802 to information stored in the reference information to see if there is a match. In one embodiment, the reference information for BFD packets comparison is stored by FPH module 116 and comprises 512 BFD session entries, each entry 12-bytes long. FIG. 11 depicts a memory structure 1100 storing BFD reference information for multiple BFD sessions according to an embodiment of the present invention. As depicted in FIG. 11, each entry 1102 stores information for a BFD session and has a 12-byte header 1104 and counters information 1106. The BFD reference information for each session may be configured by software executed by CPU 114 and used by TM Interface module 802 for the comparison.

Packet Inspection module 804 uses an index to select which one of the 512 reference information session entries of structure 1100 is to be selected for comparison with BFD packet information. As previously described, a BFD packet has a 24-byte BFD header section 916. The 24-byte header section or a portion thereof (e.g., a 12-byte section of the BFD header) may be used as an index. In one embodiment, the least significant 9 bits of the "Your Discriminator" of the BFD header section of a BFD packet that are unique per BFD session are used by the TM Interface module 802 as an index to the BFD reference memory structure. The size of the index depends upon the number of entries stored in the BFD reference information. In alternative embodiments, any unique portion of the BFD packet may be used as an index.

The index, which is based upon a portion of the BFD packet, is then used to identify a particular session entry in the BFD reference information. The reference information from the selected session entry is then compared to the information in the portion of the BFD packet received by Packet Inspection module 804 to see if there is a match. For example, for an entry in memory structure 1100 depicted in FIG. 11, the 12 header bytes of the entry are used for the comparison. Packet Inspection module 804 then sends a signal to TM Interface module 802 indicating the result of the comparison.

If TM Interface module 802 receives a signal from Packet Inspection module 804 indicating a match, then the particular BFD packet is dropped or terminated. In this manner, the BFD packet is not forwarded to CPU 114. If the signal received from Packet Inspection module 804 indicates that there was no match, it indicates to TM Interface module 802 that the BFD packet needs to be forwarded to CPU 114 for inspection and processing. TM Interface module 802 then forwards the BFD packet to CPU 114 via Rx Handler 806 and CPU Interface Module 810.

Figure 12:
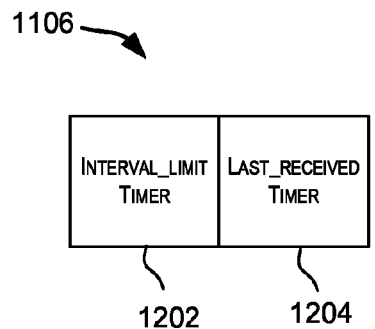
FIG. 12 depicts contents of counter information for a BFD session entry according to an embodiment of the present invention.

FPH module 116 is also configured to flag non-receipt of BFD packets for a BFD session. In one embodiment, this may be performed by TM Interface module 802. This is facilitated by counter information 1006 that is included in each session entry in the BFD reference information 1100 as depicted in FIG. 11. FIG. 12 depicts contents of counter information 1106 for a BFD session entry according to an embodiment of the present invention. As depicted in FIG. 12, counter information 1106 includes an interval_limit timer 1202 and a last_received timer 1204. Field 1202 is typically programmed by software executed by CPU 114. Interval_timer 1202 indicates the interval limit within which FPH module 116 should receive an FDP packet for that session. Last_received timer 1204 is used by FPH module 116 to monitor the time that it has waited to receive an FDP packet for the session. When a BFD packet is received for a session (i.e., when the information for a received BFD packet matches the reference information in the session entry) the last_received timer in the entry is reset. Other timers may also be provided in alternative embodiments. For example, a timer may be provided to count the number of times that the interval_limit timer value has been exceeded.

FPH module 116 iteratively checks the counters information for the various BFD session entries in memory structure 1100. When FPH module 116 determines for a session that last_received timer 1204 for the session reaches or exceeds interval_limit timer 1202, it indicates that a BFD packet for the session was not received in the expected time interval and FPH module 116 signals this error condition to CPU 114. In one embodiment, an interrupt is generated by FPH module 116 to flag that the particular BFD session has expired and there may be some failure in the network (e.g., a link is down). In this manner, non-reception of a BFD packet for a session is detected and flagged.

Counters information 1106 is monitored and checked by FPH module 116 on a periodic basis for the BFD entries. During a check, FPH module 116 walks through the session entries in the BFD reference information 1100 and checks the timers for each entry. In one embodiment, the frequency at which the checks are repeated is user-programmable. The frequency may also be determined automatically based upon the interval_limit timers for the sessions. For example, in one embodiment, the iteration frequency is set to the least common denominator of the various interval_limit timers being monitored for the various sessions by FPH module 116. In this manner, the frequency is programmable and/or may be automatically determined from the interval_limit timers information for the BFD sessions in the reference information.

In the transmit (Tx) path, FPH module 116 is configured to perform automated transmission of BFD packets for the various BFD sessions. In one embodiment, this may be performed by Tx handler 808. In one embodiment, a memory structure such as linked list 600 depicted in FIG. 6 and described above may be used to facilitate the automated transmission of BFD packets for different BFD sessions. In alternative embodiments, other types of memory structures may be used. The BFD packets transmitted by Tx Handler module 808 are forwarded to TM Interface module 802 and then to TM module 204. The BFD packets are then forwarded to one or more ports of the network device. The BFD packets are then transmitted from the network device using the one or more ports of the network device.

Processing of 802.1 ag Packets

As previously indicated, 801.1 ag packets are a type of FDP packets. The 802.1 ag standard specifies protocols, procedures, and managed objects to support transport fault management. These allow discovery and verification of the path, through bridges and LANs, taken for frames addressed to and from specified network users, detection, and isolation of a connectivity fault to a specific bridge or LAN. 802.1 ag Connectivity Fault Management (CFM) provides capabilities for detecting, verifying and isolating connectivity failures in multi-vendor networks. FPH module 116 assists the CPU of a network device in processing 802.1 ag packets, both in processing of incoming 802.1 ag packets (e.g., determining if an 802.1 ag packet should be forwarded to the CPU) and transmission of 802.1 ag packets.

FPH module 116 is capable of supporting multiple types (e.g., five different types in one embodiment) of 802.1 ag packets. FIGS. 13A and 13B depict formats for two types of 802.1 ag packets that may be processed by an embodiment of the present invention. The format depicted in FIG. 13A is for an 802.1 ag packet received from VPLS/VLL uplink. The format depicted in FIG. 13B is for an 802.1 ag packet received from a regular link.

Each 802.1 ag packet has a data section (e.g., section 1302 depicted in FIG. 13A and section 1304 depicted in FIG. 13B) that is used by FPH module 116 for analysis. FPH module 116 determines the offset within an 802.1 ag packet to access the data section of the packet. FIG. 14 depicts contents of an 802.1 ag data section. The data section comprises a "Sequence Number" field 1402 that is incremented each time an 802.1 ag packet is transmitted. Accordingly, sequence number 1402 changes with each transmission of an 802.1 ag packet. This changing field has to be taken into account when performing comparisons to determine whether an 802.1 ag packet it to be forwarded to a CPU and also while transmitting 802.1 ag packets.

FPH module 116 identifies a packet as an 802.1 ag packet using an 802.1 ag packet reference information table. FIG. 15 depicts an 802.1 ag packet reference table 1500 according to an embodiment of the present invention. Table 1500 may be stored by FPH module 116 or in some location accessible to FPH module 116. As depicted in FIG. 15, each entry in table 1500 has the following content:

(1) Etype 1 (2-bytes): This is the first Etype field after the Source MAC in the 802.1 ag packet header. This field is 0x8847 for VPLS/VLL uplink and 0x8902 for a regular link. This field is used in the comparison performed by FPH module 116 to determine if an 802.1 ag packet needs to be sent to the CPU for processing and whether it can be dropped.

(2) Etype 2 Option (1-byte): This field consists of a 1-bit check field and a 7-bit offset field. If the check bit is set, the offset field indicates the number of bytes after Etype 1 where Etype 2 can be found. If the incoming packet is from a VPLS/VLL, FPH module 116 checks the MPLS label stack for the S bit. If the bit is 0, 4-bytes will get added to the offset field.

(3) Etype 2 (2-bytes): This is compared against an incoming packet's second Etype field if the check bit is set in the Etype 2 Option's field.

(4) Etype 3 Option (1-byte): This field consists of a 1-bit check field and a 7-bit offset field. If the check bit is set, the offset field indicates the number of bytes after Etype 1 where Etype 3 can be found. Etype 3 is considered to be 0x8902 and the 802.1ag Data always starts after it.

(5) SMAC Option (1-byte): This field consists of a 1-bit check field and a 7-bit offset field. If the check bit is set, the offset field indicates the number of bytes from the last Etype where SMAC can be found.

In one embodiment, FPH module 116 uses the 802.1 ag packet reference table to determine if an incoming packet is an 802.1ag packet. If the packet is determined to be an 802.1 ag packet, then the packet is buffered and an entry for the packet created in the CPU_assist ring depicted in FIG. 7. The 802.1 ag packet is then processed as previously described with regards to FIG. 7. A portion of the 802.1 ag packet is used to perform a comparison with reference information. As described above, if there is a match, it indicates that the 802.1 ag packet need not be provided to CPU 114 and can be dropped. If there is no match, it indicates that the 802.1 ag packet is to be provided to CPU 114. In this case, a buffer swap is performed between the buffer pointed to by the entry in CPU_assist ring and a free entry in CPU ring, as previously described. CPU 114 may then access the 802.1 ag packet from buffer memory 710 and process the packet.

The use of the dual ring structure depicted in FIG. 7 and described above may be used for processing incoming 802.1 ag packets. This enables the network device to receive 802.1 ag packets even when the CPU of the network device is unable to keep up with the processing of the packets. The incoming 802.1 ag packets stored in CPU assist ring 702 are processed by FPH module 116 to determine whether the packets need to be forwarded to the CPU of the network device for further processing.

In one embodiment, various checks are made to determine whether an 802.1 ag packet needs to be forwarded to the CPU for processing. FPH module 116 first checks the Opcode field (depicted in FIG. 14) of the packet. If Opcode is 1, the 802.1 ag packet is a Continuity Check Message (CCM) and further comparisons are performed. Else, if the Opcode is not 1, then the packet is forwarded to the CPU for further processing.

As indicated above, if the 802.1 ag packet is determined to be a CCM packet, then further comparisons are performed to determine if the packet needs to be forwarded to the CPU of the network device. In one embodiment, the reference information against which the comparisons are performed includes a hash table and a sessions table. The hash table and memory table may be stored in a memory location accessible to FPH module 116 and are initialized by software executed by the CPU of the network device. In one embodiment, the hash table and sessions table may be stored in RAM (e.g., SDRAM) associated with the CPU.

Figure 16:
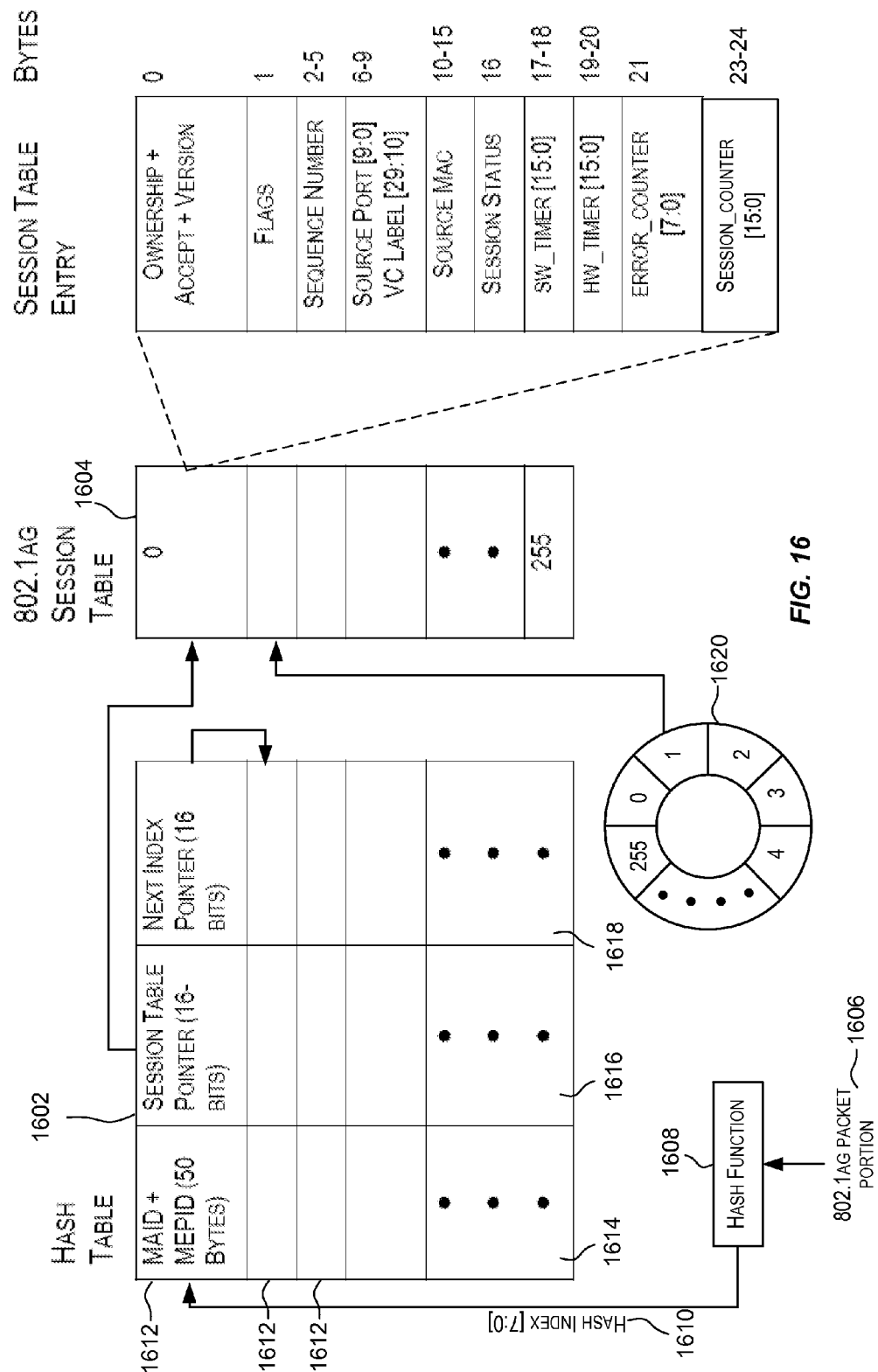
FIG. 16 depicts contents of a hash table and sessions table storing reference information according to an embodiment of the present invention.

FIG. 16 depicts contents of a hash table 1602 and sessions table 1604 storing reference information according to an embodiment of the present invention. As depicted in FIG. 16, as part of the processing, a portion 1606 of an 802.1 ag packet is fed to a hash function 1608 to generate a hash index 1610. In one embodiment, the portion of the 802.1 ag packet that is fed to hash function 1608 includes bytes 9-10 (MEPID), and bytes 13-17 and bytes 36-58 (MAID) (see FIG. 14) of the header of a CCM 802.1 ag packet. In one embodiment, hash function 1608 yields an 8-bit hash value 1610 that represents an index to an entry 1612 within hash table 1602. FPH module 116 then uses information in the entry within hash table 1602 to find an index to an entry in sessions table 1604.

According to an embodiment of the present invention, each entry 1612 in hash table 1602 comprises packet reference information 1614 to be used for comparison, a session table pointer 1616 pointing to an entry in sessions table 1604, and a next pointer 1618 pointing to the next entry in hash table 1602. In one embodiment, packet reference information 1614 comprises 50 bytes corresponding to bytes 9-10 of MEPID, and bytes 13-17 and 36-58 of MAID from a CCM 802.1 ag packet. In this embodiment, after an entry in hash table 1602 has been identified by hash index 1610 for a received 802.1 ag packet, bytes 9-10 of MEPID, and bytes 13-17 and 36-58 of MAID from the received 802.1 ag packet are compared with the 50 bytes 1614 stored in the hash table entry indexed by the 8-bit hash result. If the received packet information matches the packet reference information 1614 stored in the hash table entry, then session table pointer 1616 of the hash table entry is used to identify an entry in sessions table 1604. If there is no match, then the entries in hash table 1602 may be traversed using next pointer 1618 until a matching packet reference information is identified or until all entries have been traversed. The session table pointer 1616 of the entry comprising the matching packet reference information is then used to identify an entry in sessions table 1604. If no matching information is found in the hash table, then the received 802.1 ag packet is forwarded to the CPU of the network device.

As depicted in FIG. 16, sessions table 1604 may store a number of entries, each entry corresponding to an 802.1 ag session. In one embodiment, sessions table 1604 stores 256 entries. According to an embodiment of the present invention, each entry in sessions table 1604 comprises the following information:

(1) Ownership (1-bit): The ownership bit is used to indicate if FPH module 116 can modify the sequence number of the entry. When the bit is set, the session can be used by FPH module 116.

(2) Accept (1-bit): When this bit is set, FPH module 116 disregards the sequence number of the first 802.1 ag packet matching the session. FPH module 116 saves the incremented CCM packet sequence number in the session entry and resets the accept bit.

(3) Version (5-bits): If the version field in the session table entry does not match the corresponding information in the received 802.1 ag packet, the packet is forwarded to the CPU.

(4) Flags (8-bits): If this field in the session table entry does not match the corresponding information in the received 802.1 ag packet, the received packet is sent to the CPU.

(5) Sequence number (32-bits): Software executing on the CPU initializes a value. When the Accept bit is set, FPH module 116 accepts whatever sequence number it sees and stores it in the session entry and then resets the Accept bit. When the Accept bit is not set (i.e., is zero), FPH module 116 checks to see if the sequence number of an incoming 802.1 ag packet is 1 greater than the stored sequence number in the session table entry. If true, the sequence number of the incoming packet is correct. If the ownership bit is 1, the sequence number value is incremented and saved into the sessions table entry, so that the right value is available for comparison for that session for the next received 802.1 ag packet that will also have an incremented sequence number. If sequence number of an incoming 802.1 ag packet is not 1 greater than the stored sequence number in the session table entry, there is a potential problem and a packet with the correct expected sequence number may have been dropped. In this case, the new sequence number of the packet is stored in the session entry in the session status FIFO (described below), but the received 802.1 ag packet is not forwarded to the CPU. The updating of the sequence number in the session table entry prevents every packet, after a mismatch of sequence numbers, of being treated as a mismatch and being forwarded to the CPU.

(6) Source Port (10-bits) and VC Label (20-bits): Source port of a packet is internal header bits 64-73 and VC label is MPLS stack bits 0-19. An incoming 802.1 ag packet is sent to the CPU if the field checks below against the session entry do not match:
  i) For packets coming from VPLS/VLL link (outer Etype is 0x8847 and Inner Etype is 0x8902) FPH module 116 checks the VC label.
  ii) For packets coming from regular link (Etype is 0x8902), FPH module 116 checks the Source Port.

(7) Source MAC (6-bytes): It can be outer or inner Source MAC.

(8) Session Status (8-bits): These bits are set by FPH module 116 and encode conditions related to the session corresponding to the sessions table entry. The conditions are:
  8'h01=Session timeout
  8'h02=Sequence number mismatch
  Others=Reserved.

(9) SW timer (16-bits) (referred to above as the interval_limit timer): This field is set by software executed by the CPU and indicates the time interval that an 802.1 ag packet is expected to be received in for that session. This may be expressed as a multiple of some base timer. This is same as the interval_limit timer previously described.

(10) HW timer (16-bits) (referred to above as the last-received timer): This field is used by FPH module 116 to keep track of aging, i.e., the time that an 802.1 ag packet matching the session has not been received. It is reset by FPH module 116 every time it processes a matching 802.1 ag packet whether it is dropped or sent to the CPU. This is same as the trx_interval timer previously described.

(11) Error counter (8-bits): This field is incremented by FPH module 116 every time there is a Sequence number mismatch. At a programmable interval, FPH module 116 writes the Session pointer of a session entry and the non-zero Error counter into the Session Status FIFO.

(12) Session counter (16-bits): This field keeps track of how many packets matching a session have been received. This field is incremented by FPH module 116 every time a packet matching the session is received. Software executing on the CPU of the network device may reset the timer when it takes over the ownership of the session.

As previously described, if the received packet information matches the packet reference information 1614 stored in the hash table entry, session table pointer 1616 of the hash table entry is used to identify an entry in session table 1604. The reference information in the session table entry is then compared to information in the packet. In one embodiment, one or more fields of the particular session table entry are compared to corresponding fields of the received packet. If the compared information matches, then the received packet is dropped and not forwarded to the CPU. If the compared information does not match, then the packet is forwarded to CPU. The fields of a session table entry that are compared to the corresponding information in a received packet may differ based upon the type of the received packet, for example, the type of 802.1 ag packet. In this manner, a received 802.1ag packet is dropped if information from the packet matches reference information 1614 of an entry 1612 in hash table 1602 and information from the packet also matches reference information in a session table entry pointed to by session table pointer 1616 of the matching hash table entry 1612—else, the packet is not dropped and forwarded to the CPU for processing.

As depicted in FIG. 16, a linked list 1620 is provided that enables FPH module 116 to walk through the entries in sessions table 1604 in order to determine if an 802.1 ag packet has not been received within the expected time interval for each of the sessions. For each session entry, FPH module 116 compares the hw_timer value for the entry with the sw_timer value for the entry. If the sw_timer and hw_timer are the same for a session entry, it indicates that an 802.1 ag packet was not received within the time interval for that session and an error condition is flagged by FPH module 116. In one embodiment, FPH module 116 writes the session pointer into the Session Status FIFO that stores session pointers of the sessions that have had issues such as session timeouts or session sequence number mismatch, etc. and generates an interrupt.

Figure 17:
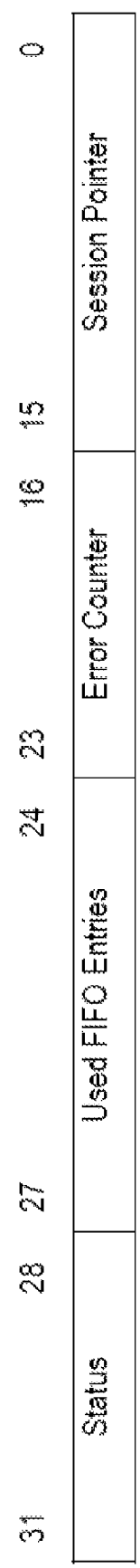
FIG. 17 depicts a format of a Session Status FIFO according to an embodiment of the present invention.

FIG. 17 depicts a format of a Session Status FIFO according to an embodiment of the present invention. As depicted in FIG. 17, the session status FIFO entry comprises:

(1) Session Pointer (16-bits): Indicates the list significant 16 bits of the pointer where there is a sequence number mismatch.

(2) Error Counter (8-bits): It is the same value as the Error Counter field in the Session Table entry. Relevant for Sequence number mismatch.

(3) Used FIFO Entries (4-bits): Indicates the number of used FIFO entries in the Session Status FIFO in 32-bit increments i.e., 4'h0: 0-32 entries, 4'h1: 33-64 entries, . . . , 4'hF: 481-512.

(4) Status (4-bits). This field indicates the condition that the entry was recorded for. The values are: 4'h1: Session timeout; 4'h2: Sequence number mismatch; Others: Reserved.

In one embodiment, an 802.1 ag packet is also sent to the CPU for processing if the following conditions below hold true: (1) The "First TLV Offset" (byte 4 of the 802.1 ag data section of a packet) is less than 70; or (2) If the "First TLV Offset" is equal to or more than 70 and the "Optional CCM TLVs" (byte 75 of CCM data) is not zero.

As indicated in FIG. 14, 802.1 ag packets comprise a sequence number whose value is incremented with each transmitted 802.1 ag packet for a session. Accordingly, when 802.1 ag packets are transmitted, the sequence numbers of the packets have to be incremented with each packet transmission. According to an embodiment of the present invention, FPH module 116 performs processing to update the sequence number prior to transmission of 802.1 ag packets.

Figure 18:
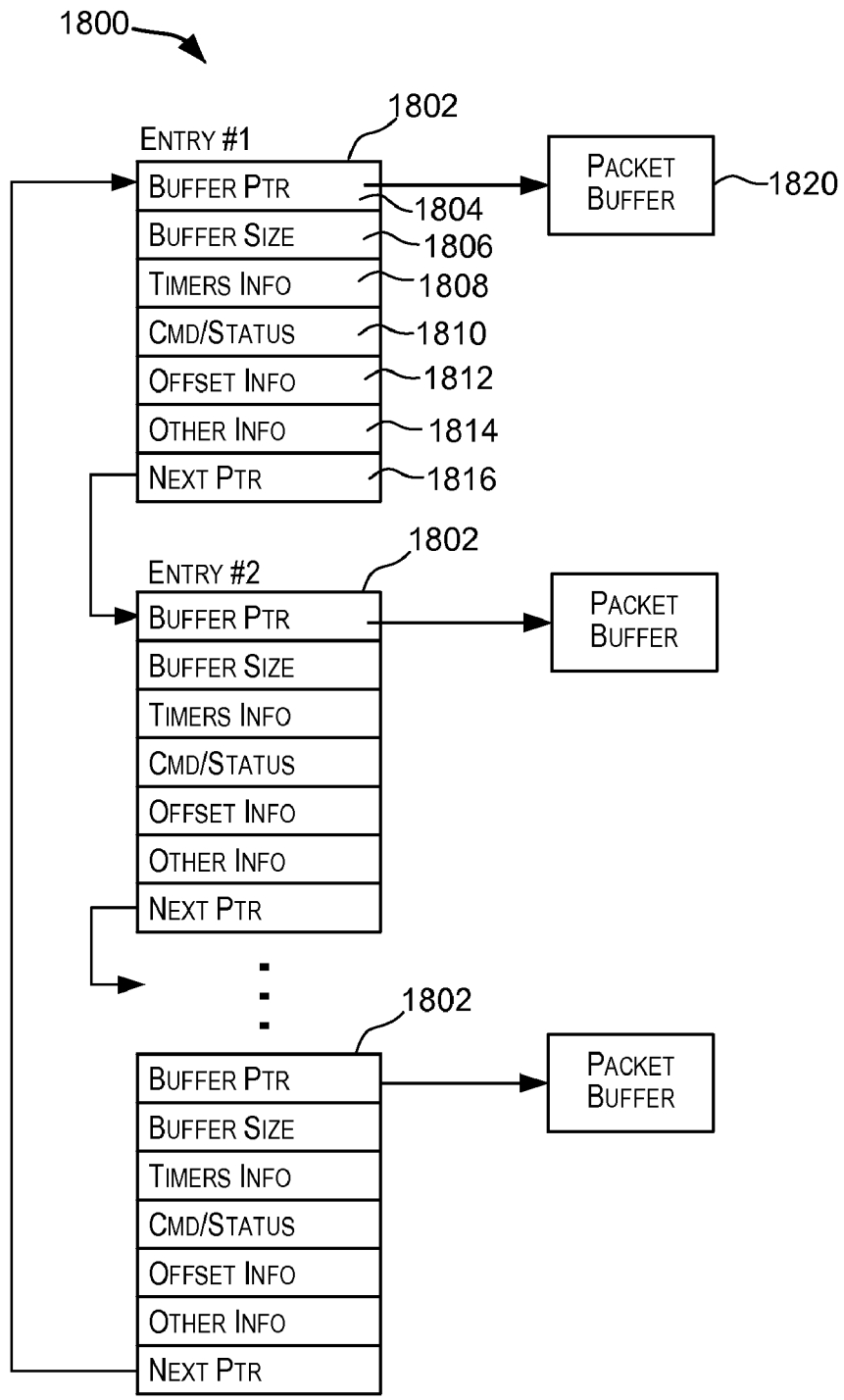
FIG. 18 depicts a linked list that may be used by an FPH module to facilitate transmission of 802.1 ag packets according to an embodiment of the present invention.

FIG. 18 depicts a linked list 1800 that may be used by FPH module 116 to facilitate transmission of 802.1 ag packets according to an embodiment of the present invention. Linked list 1800 comprises a set of entries 1802 with each entry storing information for an 802.1 ag session. Each entry comprises a buffer pointer 1804 pointing to a memory location 1820 storing the corresponding 802.1 ag packet, buffer size information 1806 identifying the size of the corresponding 802.1 ag packet, timers information 1808, command/status information 1810, offset information 1812, other information 1814, and a pointer 1816 pointing to the next entry in linked list 1800. Pointer 1816 is used to traverse the linked list. In one embodiment, linked list 1800 is a circular linked list wherein pointer 1816 of the last entry in the linked list points to the first entry in the linked list.

Timers information 1808 in an entry stores the trx_interval timer and the last_sent timer values for the 802. 1ag session corresponding to the entry. The trx_interval timer value for the session is initialized by software executed by CPU 114. As previously described, the trx_interval and last_sent timers are used to determine when to send an 802.1 ag packet for the session.

According to an embodiment of the present invention, a base timer may be associated with linked list 1800. The base timer determines the interval at which the entries in linked list 1800 are visited and checked by FPH module 116. For example, if the base timer for linked list 1800 depicted in FIG. 18 is 5 msecs, then FPH module 116 visits each entry in linked list 1800 every 5 msecs. For a linked list with an associated base timer, the trx_interval and last_sent timer values are expressed as multiples of the base timer value. For example, if the base timer value associated with linked list 1800 is 5 msecs and the periodic time interval for transmitting an 802.1 ag packet for a session is 20 msecs, then trx_interval may be represented as (4* base timer). In one embodiment, the base timer value for a linked list may be determined based upon the trx-interval timers for the various session entries in the linked list.

Command/status information 1810 may store other information related to the 802.1 ag session. For example, if the 802.1 ag session requires any special processing then that information may be stored in information 1810.

Offset information 1812 provides an offset into the 802.1 ag packet pointed to by buffer pointer 1804 pointing to information in the packet that needs to be changed prior to periodic transmission of the packet. Offset information 1812 thus identifies the location within an 802.1 ag packet that needs to be changed prior to transmission. For example, as previously described, the sequence number within an 802.1 ag needs to be incremented with each transmitted 802.1 ag packet. In such an embodiment, offset information 1812 may provide an offset to a location in the 802.1 ag packet storing sequence number information that needs to be incremented with every transmitted packet. In other types of FDP packets, other one or more offsets may be provided that may be used to access one or more sections or portions of the packet that need to be changed prior to transmission of the packet.

The sequence number information in an 802.1 ag packet is incremented by FPH module 116 with each transmission of an 802.1 ag packet for that session. The initial sequence number value may be set by software executed by the CPU of a network device. The sequence number information 1814 is then updated (e.g., incremented) after each 802.1 ag packet transmission such that the updated value may subsequently be used for the next transmitted 802.1 ag packet. In this manner, a parameter within an FDP packet may be updated with transmission of each FDP packet such that the correct parameter value is used for the next transmission.

Figure 19:
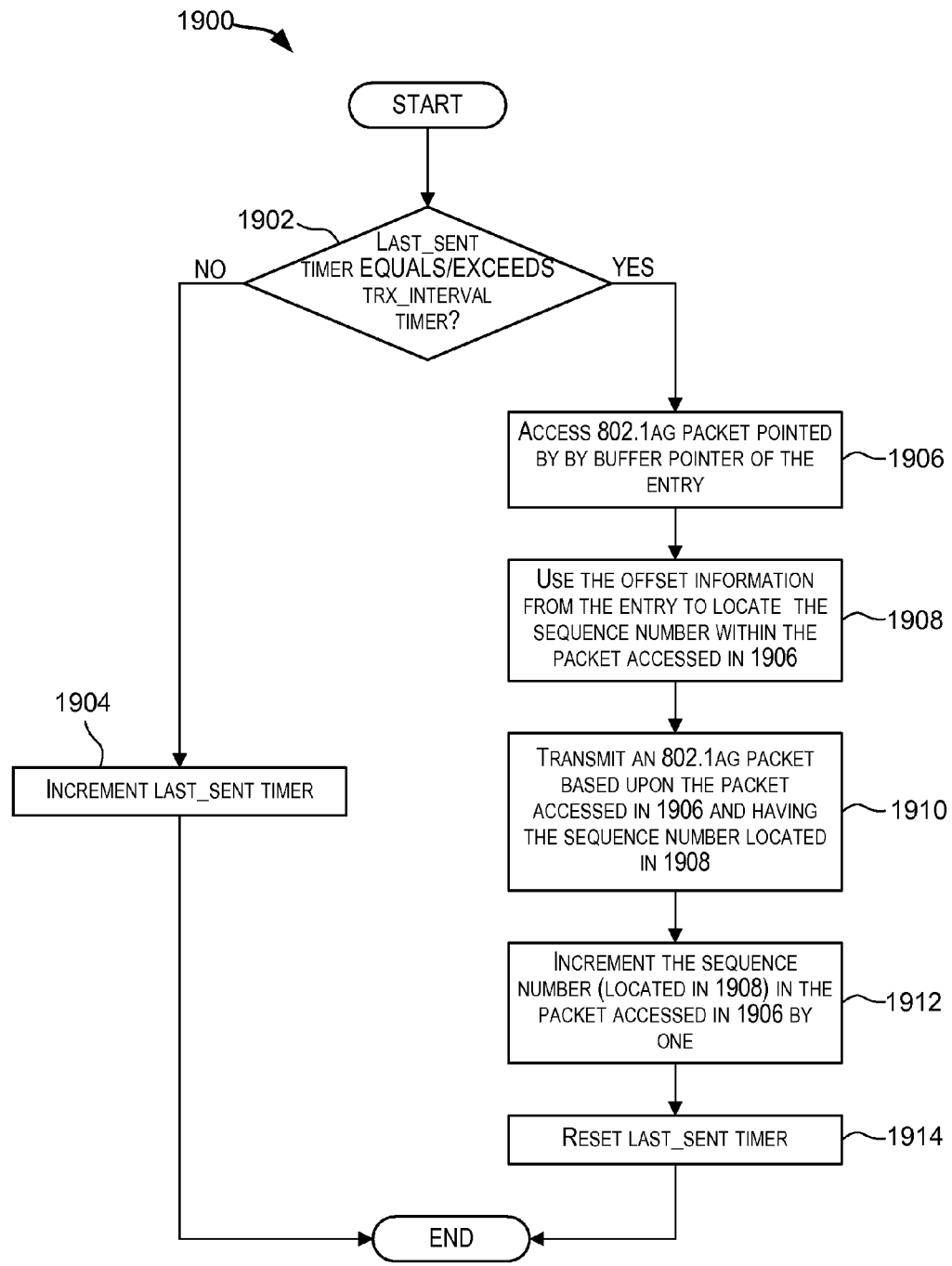
FIG. 19 depicts a simplified flowchart showing a method performed by an FPH module for transmitting 802.1 ag packets according to an embodiment of the present invention.

FIG. 19 depicts a simplified flowchart 1900 showing a method performed by FPH module 116 for transmitting 802.1 ag packets according to an embodiment of the present invention. The processing depicted in FIG. 19 is performed by FPH module 116 for each entry in a transmission linked list (e.g., linked list 1800 depicted in FIG. 18) for every iteration when the entry is checked. For a session entry in the linked list, from timers information 1808 in the session entry, FPH module 116 checks if the last_sent timer has reached the trx_interval timer (step 1902). If it is determined in 1902, that the last_sent timer has not reached the trx_interval timer (i.e., the last_sent timer is less than the trx_interval timer), it is not time yet to transmit the 802.1 ag packet and the last_sent timer is incremented (step 1904). The amount by which the last_sent timer is incremented depends upon the base timer associated with the linked list. For example, if the base timer is 5 msecs, then the last_received timer is incremented by 5 msecs.

If it is determined in 1902 that the last_sent timer has reached or exceeded the trx_interval timer for the session, FPH module 116 prepares an 802.1 ag packet for transmission. As part of this process, FPH module 116 first accesses the 802.1 ag packet pointed to by buffer pointer 1804 of the entry corresponding to the session (step 1906). Offset information 1812 of the linked list entry is then used to locate the sequence number field within the 802.1 ag packet accessed in 1906 (step 1908). An 802.1ag packet is then transmitted based upon the packet accessed in 1906 and having the sequence number located in 1908 (step 1910). As part of 1910, FPH module 116 may transmit the 802.1 ag packet to TM module 204. The 802.1 ag packet may then be forwarded to a port of the network device and transmitted from the network device via the port.

The sequence number located in 1908 in the packet accessed in 1906 is then incremented by one (step 1912). In this manner, an incremented sequence number is available for the next transmission of an 802.1 ag packet for that session. The last_sent timer in timer information 1808 for the entry is then reset to zero (step 1914) to restart the countdown to the next packet transmission.

As described above with respect to FIG. 19, the sequence number of an 802.1 ag packet stored in the buffer is incremented with each transmission of an 802.1 ag packet. In this manner, 802.1 ag packets with the correct sequence number are transmitted. The technique described above with respect to FIG. 19 may also be used to change one or more fields of FDP packets prior to transmission, as necessitated by the FDPs. In alternative embodiments of the present invention, multiple linked lists may be used by FPH module 116 to facilitate transmission of 802.1 ag packets. Each linked list may have its own associated base timer.

In the examples provided above, a linked list memory structure was used to facilitate transmission of FDP packets. Embodiments of the present invention are however not restricted to using linked lists. Other types of memory structures may also be used in alternative embodiments.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claim.

What is claimed is:

1. A method performed by a network device, the method comprising:

storing a first memory data structure, the first memory data structure storing information related to failure detection protocol packets received by the network device, wherein the information in the first memory data structure is processed by a module of the network device, the first memory data structure comprising a plurality of entries corresponding to failure detection protocol packets received by the network device and to be processed by the module, the first memory data structure enabling the failure detection protocol packets received by the network device to be processed by the module independent from processing performed by a processor of the network device, the processor configured to execute software for processing failure detection protocol packets;

storing a second memory data structure, the second memory data structure storing information related to one or more failure detection protocol packets received by the network device and that are to be processed by the processor, wherein information in the second memory data structure is processed by the processor, the second memory data structure comprising a plurality of entries corresponding to failure detection protocol packets to be processed by the processor;
storing a first failure detection protocol packet received by the network device in a buffer memory;
storing an entry in the first memory data structure for the first failure detection protocol packet, the entry storing a pointer to a location of the first failure detection protocol packet in the buffer memory;
determining by the network device, using the entry in the first memory data structure, whether the first failure detection protocol packet needs to be forwarded to the processor; and
forwarding the first failure detection protocol packet to the processor upon determining that the first failure detection protocol packet needs to be forwarded to the processor, the forwarding comprising storing, upon determining that the failure detection packet needs to be forwarded to the processor, a pointer in an entry in the second memory data structure that points to the location of the first failure detection protocol packet in the buffer memory.

2. The method of claim 1 wherein information stored in the entry in the second memory data structure enables the processor to access the first failure detection protocol packet using the entry in the second memory data structure.

3. The method of claim 1 wherein the first failure detection protocol packet is a Bidirectional Forwarding (BFD) protocol packet.

4. The method of claim 1 wherein the first failure detection protocol packet is an 802.1 ag packet.

5. The method of claim 1 wherein the first memory data structure and the second memory data structure are linked lists.

6. A system comprising:
a processor configured to execute software for processing failure detection protocol packets;
a module; and
a memory;
wherein the memory is configured to:
store a first memory data structure, the first memory data structure storing information related to failure detection protocol packets received by the system, wherein the information in the first memory data structure is processed by the module, the first memory data structure comprising a plurality of entries corresponding to failure detection protocol packets received by the network device and to be processed by the module, the first memory data structure enabling the failure detection protocol packets received by the network device to be processed by the module independent from processing performed by the processor;
store a second memory data structure, the second memory data structure storing information related to one or more failure detection protocol packets received by the network device and that are to be processed by the processor, wherein information in the second memory data structure is processed by the processor, the second memory data structure comprising a plurality of entries corresponding to failure detection protocol packets to be processed by the processor;
store a first failure detection protocol packet received by the system; and
wherein the first memory data structure comprises an entry storing a pointer to a location of the first failure detection protocol packet in the memory;
wherein the module is configured to:
determine, using the entry in the first memory data structure, whether the first failure detection protocol packet needs to be forwarded to the processor; and
cause the first failure detection protocol packet to be forwarded to the processor upon determining that the first failure detection protocol packet needs to be forwarded to the processor by causing a pointer in an entry in the second memory data structure to point to the location of the first failure detection protocol packet in the memory upon determining that the failure detection packet needs to be forwarded to the processor.

7. The system of claim 6 wherein information stored in the entry in the second memory data structure for the first failure detection protocol packet enables the processor to access the first failure detection protocol packet.

8. The system of claim 6 wherein the first failure detection protocol packet is a Bidirectional Forwarding (BFD) protocol packet.

9. The system of claim 6 wherein the first failure detection protocol packet is an 802.1 ag packet.

10. The system of claim 6 wherein the first memory data structure and the second memory data structure are linked lists.

11. The system of claim 6 wherein the module is a field-programmable logic device.

12. A method performed by a network device comprising:
providing a first memory data structure for storing information that is processed by a module of the network device, the first memory data structure comprising a plurality of entries corresponding to failure detection protocol packets received by the network device and to be processed by the module;
providing a second memory data structure for storing information that is processed by a processor of the network device, the second memory data structure comprising a plurality of entries corresponding to failure detection protocol packets to be processed by the processor;
storing a failure detection protocol packet received by the network device in a buffer memory;
accessing, by the module, the failure detection protocol packet from the memory using information stored in an entry in the first memory data structure;
determining, by the module, whether the failure detection protocol packet needs to be forwarded to the processor; and
upon determining that the failure detection protocol packet needs to be forwarded to the processor, storing, in an entry in the second memory data structure, information that enables the processor to access the failure detection protocol packet from the buffer memory.

13. A system comprising:
a processor configured to execute software for processing failure detection protocol packets;
a module; and
a memory;
wherein the memory is configured to:
store a first memory data structure for storing information that is processed by the module, the first memory data structure comprising a plurality of entries corresponding to failure detection protocol packets received by the network device and to be processed by the module;

store a second memory data structure for storing information that is processed by the processor, the second memory data structure comprising a plurality of entries corresponding to failure detection protocol packets to be processed by the processor; and store a failure detection protocol packet received by the system;

wherein the module is configured to:

access the failure detection protocol packet from the memory using information stored in an entry in the first memory data structure; and determine whether the failure detection protocol packet needs to be forwarded to the processor; and upon determining that the failure detection protocol packet needs to be forwarded to the processor, store, in an entry in the second memory data structure, information that enables the processor to access the failure detection protocol packet from the memory.

14. A method comprising:

providing, by a network device, a first memory data structure for storing information processed by a module of a network device, the first memory data structure comprising a plurality of entries corresponding to failure detection protocol packets received by the network device and to be processed by the module;

providing, by the network device, a second memory data structure for storing information processed by a processor of the network device, the processor configured to execute software for processing one or more failure detection protocol packets received by the network device, the second memory data structure comprising a plurality of entries corresponding to failure detection protocol packets to be processed by the processor;

storing an entry in the first memory data structure for a first failure detection protocol packet received by the network device;

determining by the network device, using the entry in the first memory data structure, whether the first failure detection protocol packet needs to be forwarded to the processor; and dropping, by the network device, the first failure detection protocol packet prior to the first failure detection protocol packet being processed by the processor upon determining that the first failure detection protocol packet does not need to be forwarded to the processor.

15. The method of claim 14 further comprising:

storing an entry in the first memory data structure for a second failure detection protocol packet received by the network device;

determining by the network device, using the entry in the first memory data structure for the second failure detection protocol packet, whether the second failure detection protocol packet needs to be forwarded to the processor; and upon determining that the second failure detection protocol packet needs to be forwarded to the processor, storing, in an entry in the second memory data structure, information that enables the processor to access the second failure detection protocol packet.

16. A system comprising:

a processor configured to execute software for processing failure detection protocol packets;

a module; and a memory;

wherein the memory is configured to:

store a first memory data structure for storing information processed by the module, the first memory data structure comprising an entry for a first failure detection protocol packet received by the system, the first memory data structure comprising a plurality of entries corresponding to failure detection protocol packets received by the network device and to be processed by the module; and store a second memory data structure for storing information processed by the processor, the second memory data structure comprising a plurality of entries corresponding to failure detection protocol packets to be processed by the processor;

wherein the module is configured to:

determine, using the entry in the first memory data structure, that the first failure detection protocol packet does not need to be forwarded to the processor; and cause the first failure detection protocol packet to be dropped prior to the first failure detection protocol packet being processed by the processor upon determining that the first failure detection protocol packet does not need to be forwarded to the processor.

17. The system of claim 16 wherein:

the first memory data structure comprises an entry for a second failure detection protocol packet received by the network device;

the module is configured to:

determine, using the entry in the first memory data structure for the second failure detection protocol packet, whether the second failure detection protocol packet needs to be forwarded to the processor; and upon determining that the second failure detection protocol packet needs to be forwarded to the processor, cause an entry to be stored in the second memory data structure, the entry in the second memory data structure storing information that enables the processor to access the second failure detection protocol packet.

* * * * *